US012517898B2

(12) United States Patent
Seetharaman et al.

(10) Patent No.: US 12,517,898 B2
(45) Date of Patent: Jan. 6, 2026

(54) TECHNIQUES FOR UTILIZING PATTERNS AND LOGICAL ENTITIES

(71) Applicant: Oracle International Corporation, Redwood Shores, CA (US)

(72) Inventors: Ganesh Seetharaman, Redwood City, CA (US); Robert Velisar, Belmont, CA (US); Geoffrey William Watters, Camberley (GB); Yuda Dai, Mountain View, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 17/980,412

(22) Filed: Nov. 3, 2022

(65) Prior Publication Data

US 2023/0055129 A1  Feb. 23, 2023

Related U.S. Application Data

(63) Continuation of application No. 17/217,881, filed on Mar. 30, 2021, now Pat. No. 11,520,782.

(Continued)

(51) Int. Cl.
*G06F 16/245* (2019.01)
*G06F 16/22* (2019.01)
(Continued)

(52) U.S. Cl.
CPC ........ *G06F 16/245* (2019.01); *G06F 16/2282* (2019.01); *G06F 16/2379* (2019.01); *G06F 16/248* (2019.01)

(58) Field of Classification Search
None
See application file for complete search history.

(56) References Cited

U.S. PATENT DOCUMENTS 7,496,561 B2   2/2009  Caudill et al.
7,499,923 B2   3/2009  Kawatani
(Continued)

FOREIGN PATENT DOCUMENTS

CN   102760173   4/2015
WO    03063008   7/2003

OTHER PUBLICATIONS

A Smart Data Catalog, A Must-have for Data Leaders, Zeenea Software, Data Catalog, Available Online At: https://zeenea.com/a-smart-data-catalog-a-must-have-for-data-leaders/, Aug. 26, 2020, 9 pages.

(Continued)

*Primary Examiner* — Dawaune A Conyers
(74) *Attorney, Agent, or Firm* — Kilpatrick Townsend & Stockton LLP

(57) ABSTRACT

Systems, devices, and methods discussed herein are directed to utilizing patterns and logical entities to identify and maintain relationships between data assets. In some embodiments, a query comprising a logical entity qualifier, one or more pattern identifiers that indicate a pattern, and a data set identifier may be received. The pattern is executed against a data set corresponding to the data set identifier and one or more logical entities are generated based on this execution. A logical entity may be a label that represents a set of one or more data assets in a data set. Assets that share a label can share attributes that are described by the label. The label corresponding to each logical entity may be presented, where each label represents a different set of data assets which share a common trait. In some embodiments, the user may define a pattern by which commonality may be assessed.

20 Claims, 12 Drawing Sheets

Related U.S. Application Data

(60) Provisional application No. 63/091,213, filed on Oct. 13, 2020.

(51) Int. Cl.
*G06F 16/23* (2019.01)
*G06F 16/248* (2019.01)

(56) References Cited

U.S. PATENT DOCUMENTS

| | | | |
|---|---|---|---|
| 7,908,280 B2 | 3/2011 | Frank et al. | |
| 9,405,820 B2 | 8/2016 | Shmueli et al. | |
| 9,928,379 B1 | 3/2018 | Hoffer | |
| 10,705,796 B1* | 7/2020 | Doyle | G06F 16/282 |
| 11,625,366 B1* | 4/2023 | Steiman | G06N 5/022 |
| | | | 707/601 |
| 2008/0183704 A1 | 7/2008 | Miller et al. | |
| 2011/0113048 A1 | 5/2011 | Njemanze | |
| 2012/0254143 A1 | 10/2012 | Varma et al. | |
| 2013/0198227 A1 | 8/2013 | Fradkin et al. | |
| 2013/0246431 A1* | 9/2013 | Ahuja | G06F 16/358 |
| | | | 707/E17.089 |
| 2014/0059078 A1 | 2/2014 | Gulwani et al. | |
| 2014/0149401 A1 | 5/2014 | Liu et al. | |
| 2015/0074034 A1* | 3/2015 | Ait-Mohktar | G06F 16/835 |
| | | | 706/50 |
| 2016/0103887 A1 | 4/2016 | Fletcher et al. | |
| 2017/0017636 A1 | 1/2017 | Hasan et al. | |
| 2017/0019487 A1 | 1/2017 | Maheshwari et al. | |
| 2018/0024901 A1 | 1/2018 | Tankersley et al. | |
| 2018/0307576 A1* | 10/2018 | Debnath | G06F 11/34 |
| 2019/0228085 A1 | 7/2019 | Biswas et al. | |
| 2020/0104897 A1 | 4/2020 | Oh et al. | |
| 2020/0117587 A1 | 4/2020 | Salim | |
| 2021/0097102 A1 | 4/2021 | Moroney | |
| 2021/0133557 A1* | 5/2021 | Iyoob | G06F 40/205 |
| 2022/0035799 A1 | 2/2022 | Bhutada et al. | |

OTHER PUBLICATIONS

Informatica Enterprise Data Catalog, Data Sheet, Available Online At: https://www.informatica.com/content/dam/informatica-com/en/collateral/data-sheet/enterprise-data-catalog_data-sheet_3238en.pdf, 2020, pp. 1-8.

Introducing Data Identifiers, Symantec™ Data Loss Prevention 15.7, Available Online At: https://help.symantec.com/cs/DLP15.7/DLP/v40848904_v133697641/Introducing-data-identifiers?locale=EN_US, Accessed from Internet on Nov. 24, 2020, 1 page.

Pattern Matcher (xm_pattern), NXLog User Guide, Available Online At: https://nxlog.co/documentation/nxlog-user-guide/xm_pattern.html, 2020, pp. 1-5.

Tutorial: Register Data Assets in Azure Data Catalog, Microsoft, Azure / Data Cataloge, Available Online At: https://docs.microsoft.com/en-us/azure/data-catalog/register-data-assets-tutorial, Aug. 1, 2019, 21 pages.

U.S. Appl. No. 17/217,881, Non-Final Office Action mailed on Mar. 31, 2022, 15 pages.

U.S. Appl. No. 17/217,881, Notice of Allowance mailed on Sep. 20, 2022, 7 pages.

Pathak, Classify to Completion: A Data Cataloging Story, Big Data, Available Online at: https://blogs.informatica.com/2017/03/14/classify-completion-data-cataloging-story/, Mar. 14, 2017, pp. 1-6.

* cited by examiner

| Id | | Name | Expression | Sequence | Parent | refPattern |
|---|---|---|---|---|---|---|
| 100 | | SomePattern | | | | |
| | 2 | | yny | 1 | 100 | 106 |
| | 3 | | iad | 2 | 100 | |
| | 4 | | | 2 | 100 | |
| | 5 | | *.json | 3 | 100 | |
| 102 | | Cloud_Regions | | | | |
| | 2 | | iad | 1 | 102 | |
| | 3 | | yny | 1 | 102 | |
| | 4 | | ams | 1 | 102 | |
| | 5 | | hyd | 1 | 102 | |
| | 6 | | zrh | 1 | 102 | |
| 103 | | Frequency | | | | |
| | 2 | | hourly | 1 | 103 | |
| | 3 | | daily | 1 | 103 | |
| | 4 | | monthly | 1 | 103 | |
| 104 | | Timestamp | | | | |
| | 2 | | YYYYMMDD | 1 | 104 | |
| | 3 | | YYYYMonDD_HH24MINS | 1 | 104 | |
| 105 | | Json File Type | | | | |
| | 2 | | *.json | 1 | 105 | |
| 106 | | AnyAlpha | | | | |
| | 2 | | [a-zA-Z]* | 1 | 106 | |
| 107 | | OtherPattern | | | | |
| | 2 | | {Pattern:AnyAlpha} | 1 | 1 | |

FIG. 2

```
bling_metering/19701205020_yny_hourly_region_res_delayed.json.gz
bling_metering/19731105023_yny_hourly_region_res_delayed.json.gz
bling_metering/19761015015_yny_hourly_region_res_delayed.json.gz
bling_metering/19791027012_yny_hourly_region_res_delayed.json.gz
bling_metering/19831011010_yny_hourly_region_res_delayed.json.gz
bling_metering/19880727008_yny_hourly_region_res_delayed.json.gz
bling_metering/19881016005_hyd_hourly_region_res_delayed.json.gz
bling_metering/19910423002_yny_hourly_region_res_delayed.json.gz
bling_metering/19931230017_yny_hourly_region_res_delayed.json.gz
bling_metering/19960825015_yny_hourly_region_res_delayed.json.gz
bling_metering/19990419023_yny_hourly_region_res_delayed.json.gz
bling_metering/20011216008_yny_hourly_region_res_delayed.json.gz
bling_metering/20040721017_yny_hourly_region_res_delayed.json.gz
bling_metering/20070410010_yny_hourly_region_res_delayed.json.gz
bling_metering/20091221006_yny_hourly_region_res_delayed.json.gz
bling_metering/20120805005_yny_hourly_region_res_delayed.json.gz
bling_metering/20150330017_yny_hourly_region_res_delayed.json.gz
bling_metering/20171206006_yny_hourly_region_res_delayed.json.gz
bling_metering/20190730019_zrh_hourly_region_res_delayed.json.gz
bling_metering/20190730020_zrh_hourly_region_res_delayed.json.gz
bling_metering/20190730021_zrh_hourly_region_res_delayed.json.gz
bling_metering/20190730022_zrh_hourly_region_res_delayed.json.gz
bling_metering/20190803002_zrh_hourly_region_res_delayed.json.gz
bling_metering/20190809015_zrh_hourly_region_res_delayed.json.gz
```

TECHNIQUES FOR UTILIZING PATTERNS AND LOGICAL ENTITIES

CROSS-REFERENCE TO RELATED APPLICATIONS

This application is a continuation of U.S. application Ser. No. 17/217,881, filed Mar. 30, 2021, entitled, "TECHNIQUES FOR UTILIZING PATTERNS AND LOGICAL ENTITIES," which claims the benefit of and priority to U.S. Provisional Application No. 63/091,213, filed Oct. 13, 2020, and entitled, "TECHNIQUES FOR PATTERNS AND LOGICAL ENTITIES," the content of which is herein incorporated by reference in its entirety.

BACKGROUND

Enterprises collect and handle large amounts of data obtained from a variety of sources. The proliferation of data creates several challenges including organization, discoverability, identifying a singular view of any one data entity or subject area, and relevancy. It can be difficult to understand and/or discover the manner in which data instances relate to one another. Embodiments described herein address these and other problems, individually and collectively.

BRIEF SUMMARY

Techniques are provided (e.g., a method, a system, non-transitory computer-readable medium storing code or instructions executable by one or more processors) for utilizing patterns and logical entities to identify and maintain relationships between data assets. Various embodiments are described herein, including methods, systems, non-transitory computer-readable storage media storing programs, code, or instructions executable by one or more processors, and the like.

One embodiment is directed to a method for identifying and/or maintaining relationships between data assets. The method may comprise receiving, by a computing device, a query comprising a logical entity qualifier, one or more pattern identifiers that indicate a pattern, and a data set identifier. The pattern is executed, by the computing device, against a data set corresponding to the data set identifier. One or more logical entities (e.g., label(s) that represent a corresponding set of one or more data assets of the data set) are generated by the computing device in real time based at least in part on executing the pattern against the data set. The one or more labels corresponding to the one or more logical entities are presented, each label representing a different set of data assets of the data set.

Another embodiment is directed to a computing device. The computing device may comprise a computer-readable medium storing non-transitory computer-executable program instructions. The computing device may further comprise a processing device communicatively coupled to the computer-readable medium for executing the non-transitory computer-executable program instructions. Executing the non-transitory computer-executable program instructions with the processing device causes the computing device to perform operations. These operations may comprise receiving, by a computing device, a query comprising a logical entity qualifier, one or more pattern identifiers that indicate a pattern, and a data set identifier. The pattern is executed, by the computing device, against a data set corresponding to the data set identifier. One or more logical entities (e.g., label(s) that represent a corresponding set of one or more data assets of the data set) are generated by the computing device in real time based at least in part on executing the pattern against the data set. The one or more labels corresponding to the one or more logical entities are presented, each label representing a different set of data assets of the data set.

Yet another embodiment is directed to a non-transitory computer-readable storage medium storing computer-executable program instructions that, when executed by a processing device of a computing device, cause the computing device to perform operations. These operations may comprise receiving, by a computing device, a query comprising a logical entity qualifier, one or more pattern identifiers that indicate a pattern, and a data set identifier. The pattern is executed, by the computing device, against a data set corresponding to the data set identifier. One or more logical entities (e.g., label(s) that represent a corresponding set of one or more data assets of the data set) are generated by the computing device in real time based at least in part on executing the pattern against the data set. The one or more labels corresponding to the one or more logical entities are presented, each label representing a different set of data assets of the data set.

The foregoing, together with other features and embodiments will become more apparent upon referring to the following specification, claims, and accompanying drawings.

BRIEF DESCRIPTION OF THE DRAWINGS

Various embodiments in accordance with the present disclosure will be described with reference to the drawings, in which:

FIG. 2 illustrates an example pattern library, in accordance with at least one embodiment;

FIG. 4 illustrates an example data set, in accordance with at least one embodiment;

DETAILED DESCRIPTION

Figure 1:
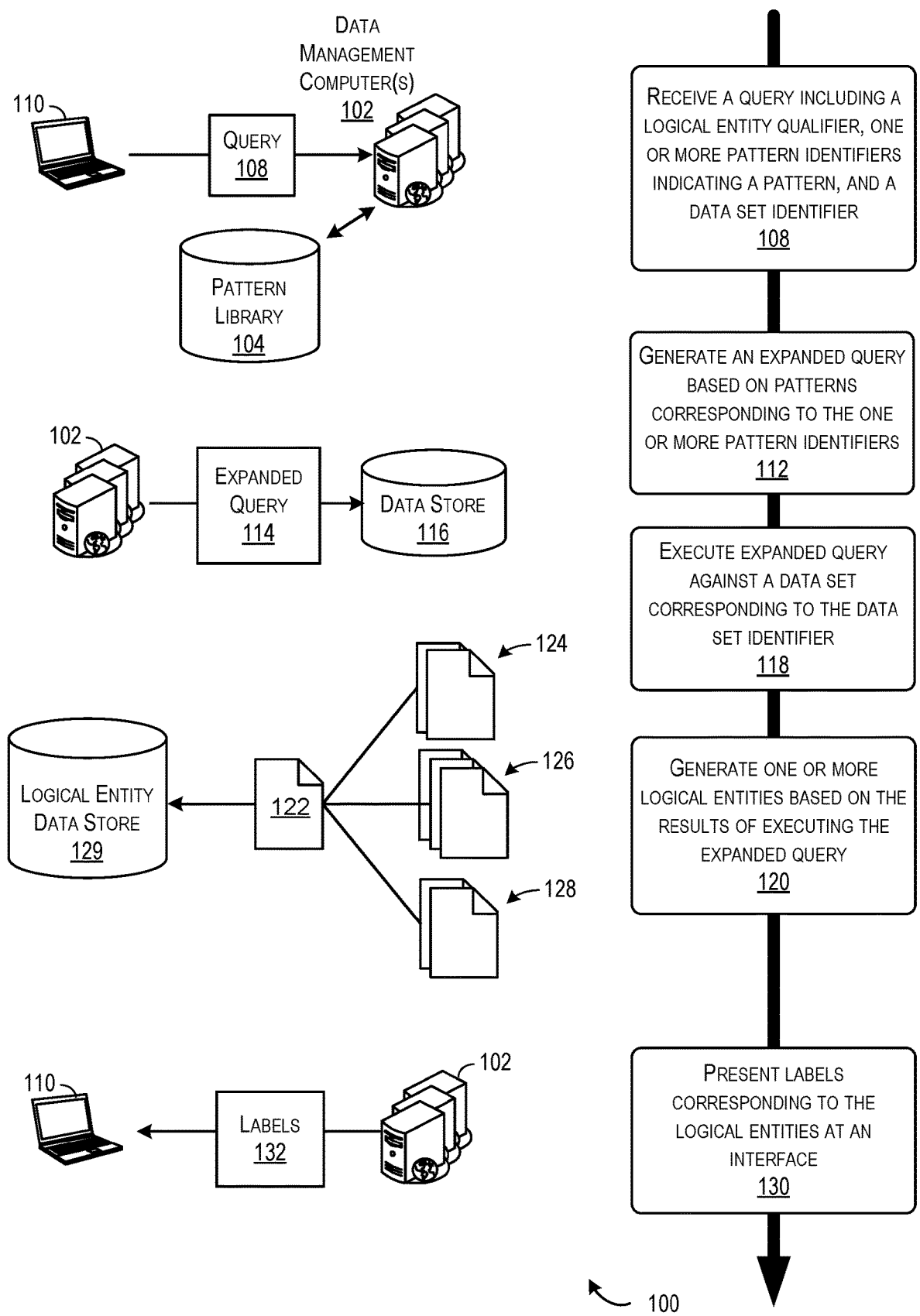
FIG. 1 illustrates a flow for generating one or more logical entities, according to at least one embodiment.

In the following description, for the purposes of explanation, specific details are set forth in order to provide a thorough understanding of certain embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

The present disclosure relates to a system and techniques for identifying and/or maintaining relationships between data assets utilizing patterns and logical entities. A "pattern" refers to a sequence of characters of a predefined syntax that define a search pattern. As used herein, a "logical entity" refers to a label that identifies a set of data assets (e.g., files, documents, objects, containers, etc.). In some embodiments, a logical entity may correspond with a table that maintains a mapping between the label and the particular set of data assets to which the label refers.

A user may wish to filter out unnecessary data noise while viewing data assets. For example, while browsing data assets, the user may wish to view only a subset of files that pertain to his particular task. Embodiments herein disclose a method for defining a query using a predefined and/or user-defined library of patterns. In some embodiments, the user may define a pattern using one or more characters from a predefined regular expressions (regex) library. The user may save this pattern as being associated with a pattern identifier and/or pattern name which may then be subsequently used to refer to the pattern. The user may then subject any suitable number of queries against a data set utilizing any of his predefined patterns. In some embodiments, utilizing the pattern will cause the system to filter from view any data asset that does not match the pattern. Thus, the user may utilize these patterns to view only the data assets in which he has interest, while the remaining data assets are hidden from view.

As another example, the user may utilize newly defined or previously defined patterns to generate a number of logical entities. By way of example, the user may submit a query that includes a logical entity qualifier (e.g., "LogicalEntity:", "-Logical Entity", etc.) and a pattern with which the logical entity is to be generated (sometimes referred to as a "search pattern"). The system may utilize the pattern to identify a logical entity (e.g., a label that represents a set of data assets that share a common version of the pattern). Any number of logical entities may be identified across the data set, with each logical entity corresponding to a different set of data assets that share a common version of the pattern. In some embodiments, a table (or another suitable storage container) may be utilized to maintain associations between the logical entity (e.g., the label) and each of the data assets in the corresponding set. These logical entities (e.g., labels) may be presented to the user, enabling the user to ascertain details about the data set that would have previously been difficult and/or time consuming to ascertain. The logical entities and the corresponding data asset sets may be determined and/or updated in real time. Thus, these logical entities may be updated to reflect current labels and/or associated data assets in real time, as changes are made to the data set.

The disclosed techniques provide improvements over conventional systems. For example, conventional systems may lack the ability for a user to view a data set as a condensed set of labels. By using these labels, the user may perform a variety of operations using the label to refer to the associated data assets as a whole. This provides an understanding of the data set and operations that were previously unavailable to the user.

Moving on to FIG. 1, which illustrates a flow 100 for generating one or more logical entities, in accordance with at least one embodiment. Data management computer(s) 102 may be include any suitable number of computing devices that individually and/or collectively maintain a data set. In some embodiments, the data management computer(s) 102 is a distributed cluster computing system including manager nodes and worker nodes, where each nodes is a computing device or a virtual machine. A manager node may be configured to receive task requests (e.g., from client devices, not pictured) and to assign execution of the corresponding tasks to worker nodes of the data management computer(s) 102. Each worker node may operate an executor module (e.g., a software or hardware module) that is configured to perform operations in response to receiving task data from a manager node. In some embodiments, each worker node and/or manager node of the data management computer(s) 102 may be configured to execute a distributed data processing engine.

In some embodiments, the data management computer(s) 102 is communicatively coupled to a pattern library 104 that includes one or more previously user-defined patterns. FIG. 2 illustrates an example pattern library 200 (e.g., an example of the pattern library 104 of FIG. 1), in accordance with at least one embodiment. As illustrated, the pattern library 200 is a table with columns 202, 204, 206, 208, 210, and 212, although it should be appreciated that such data may be otherwise maintained in another suitable container such as a list, an object, a mapping, or the like. The particular columns illustrated are not necessary exhaustive, and additional or fewer corresponding data fields may be included for any and/or all of the patterns defined in pattern library 200. The pattern library 200 may include any suitable number of patterns, each pattern having one or more fragments that identify a portion of the pattern which are identified as being associated with a particular pattern through column 210. By way of example, a pattern may be defined utilizing line 214 and fragments 216-222.

Line 214 may be utilized to define an identifier (e.g., 100) and a name (e.g., SomePattern) for a given pattern. Each of the fragments 216-222 may be associated with the identifier of the pattern (e.g., 100) via column 210 and reference to a parent identifier (e.g., 100). The sequence number of a fragment (e.g., corresponding to the corresponding data field in column 208) may be utilized to identify a sequence between fragments. Two or more fragments sharing the same sequence number may be interpreted as a logical or (e.g., ||). Fragment 216 is an example in which another previously defined pattern may be referenced (e.g., pattern 106). Thus, the expression defined by pattern 106 (e.g., corresponding to, in this case, fragment 224) may be used as the expression in fragment 216. Fragment 226 of pattern 107 may similarly reference pattern 106, in this case, using a pattern qualifier (e.g., "Pattern:") and the specified name of pattern 106 (e.g., "AnyAlpha").

Returning to pattern 100, each fragment may identify a portion of the pattern according to the sequence number. Thus, the expanded pattern corresponding to pattern 100 is [a-zA-Z]*/YnY||iad/*.json, wherein [a-zA-Z]* is obtained from pattern 106 of pattern library 200. The pattern "SomePattern" may be used as a query to match data assets such as tmp/yny/1000.json, tmp/iad/1001.json, but would not match tmp/hyd/1002.json. The pattern "Cloud-Regions" in expanded form may match any data asset that includes "iad", "yny", "ams", "hyd", or "zrh". Pattern 103 may be used to match any data asset that includes "hourly", "daily", or "monthly". Patterns 104 and 105 may be similarly utilized to define patterns for timestamps and a JSON file, respectively.

Returning to FIG. 1, the patterns of pattern library 104 may be predefined and stored via any suitable data store. In some embodiments, the data management computer(s) 102 may provide interfaces and/or application programming interface(s) (API(s)) for adding and/or removing a pattern to/from the pattern library 104. The example depicted in FIG. 1 presumes that the pattern library 104 has already been, at least partially defined and previously stored so as to be accessible to the data management computer(s) 102.

The flow 100 may begin at 106, where a query (e.g., query 108) is received (e.g., from user device 110, an example of a laptop, or any suitable computing device operated by a user). In some embodiments, the query 108 may be provided via an interface hosted by the data management computer(s) 102 or the query 108 may be received via an application programming interface or the like. In some embodiments, the query may include any suitable combination of a logical entity qualifier (e.g., "LogicalEntity:", "-LE", or any suitable indicator with which a logical entity may be indicated), one or more pattern identifiers that indicate a pattern, and data set identifier (e.g., indicating a location of the data set to be queried). By way of example, the following may be received as query 108:
{Bucket:%}/{Pattern:Timestamp}_{LogicalEntity:{Pattern:OCI_Regions}_{Pattern:Frequency}_%}.{Pattern:Json File Type}
where "{Bucket:%} indicates a bucket qualifier coupled with a wildcard (e.g., %) indicating any pattern. The fragment {Bucket:%} may be an example of a data set identifier that identifies the data set as being any suitable path. As another example, {Bucket:*bling_metering/} may define the data set as being any data asset within a folder with a path ending in "bling_metering/". The pattern qualifier (e.g., "Pattern:") may be used to refer, by name, to a previously defined pattern. For example, {Pattern:Timestamp} is used to refer to pattern 104 of FIG. 2. {Pattern:Cloud_Regions} is used to refer to pattern 102 of FIG. 2. {Pattern:Frequency} is used to refer to pattern 103 of FIG. 2. {Pattern:Json File Type} is used to refer to pattern 105 of FIG. 2. The logical entity qualifier (e.g., "LogicalEntity:") may be used to define a pattern for generating logical entities (e.g., labels that describe a unique sets of data assets that similarly match the pattern.

At 112, an expanded query 114 may be generated (e.g., by the data management computer(s) 102) based on the pattern identifiers (e.g., {Pattern:Timestamp}, {Pattern:Cloud_Regions}, {Pattern:Frequency}, and Pattern:Json File Type) of query 108 to retrieve corresponding patterns defined in pattern library 104.

At 116, the data management computer(s) 102 may execute the expanded query against a data set corresponding to the data set identifier provided in query 108. By way of example, the data management computer(s) 102 may execute the expanded query 114 against all or part of the data store 116 based on the pattern defined and associated with the bucket qualifier. Thus, only data assets that are stored in paths that match the pattern defined and associated with the bucket qualifier will be queried.

Figure 3:
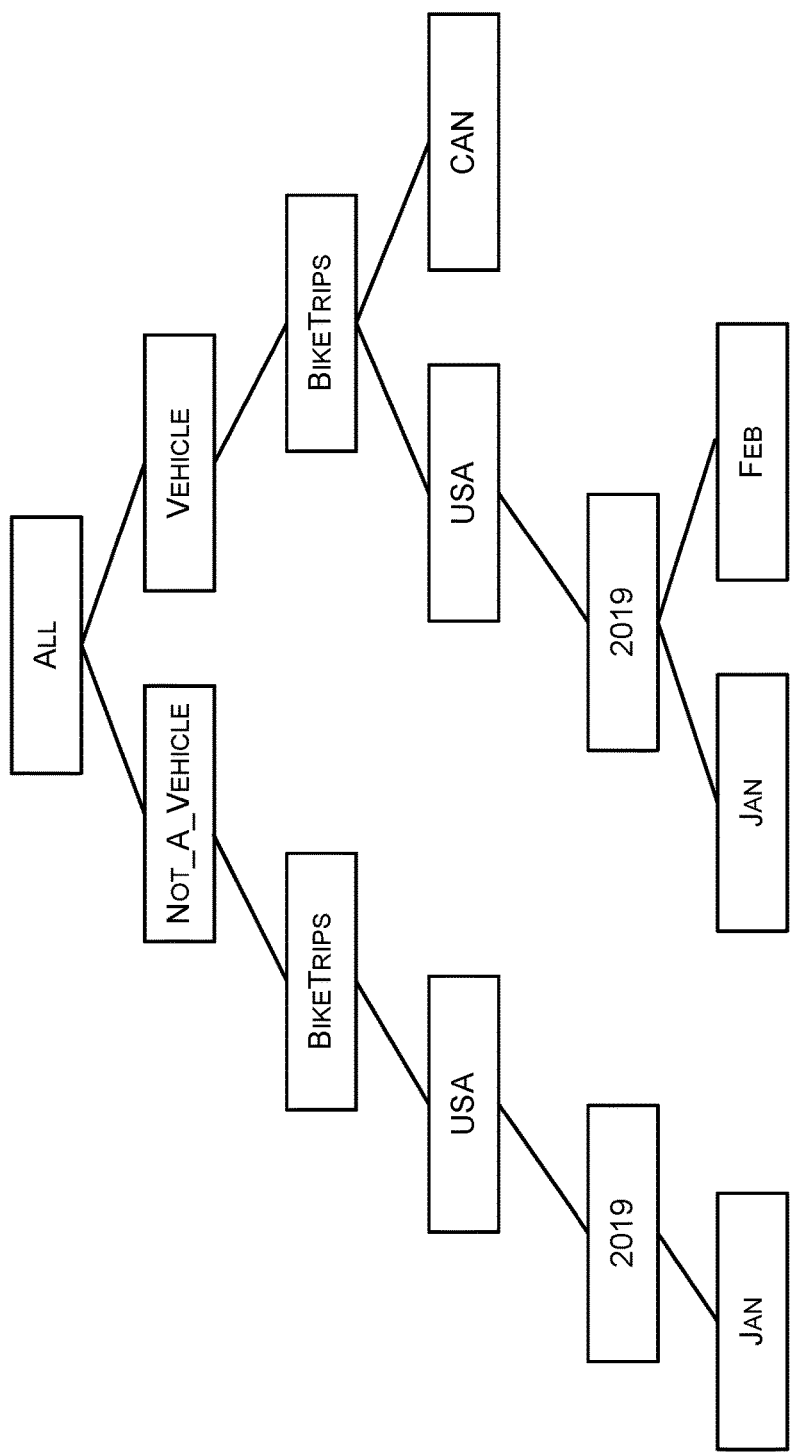
FIG. 3 illustrates an example folder structure across which a number of data assets may be distributed, in accordance with at least one embodiment.

FIG. 3 illustrates an example folder structure 300 (or other suitable container such as data store 116 of FIG. 1) across which a number of data assets may be distributed (e.g., the data assets of data set 400 of FIG. 4), in accordance with at least one embodiment. Each folder may store any suitable number of data assets, some of which may include one or more of the data assets of data set 400.

FIG. 4 illustrates an example data set 400, in accordance with at least one embodiment. The data assets of the data set 400 illustrated in FIG. 4 may be initially generated by any suitable method, perhaps as output files to various services of a cloud environment and stored at various locations (e.g., the same folder, in differing folders, etc.) within folder structure 300 of FIG. 3 (or another suitable folder structure). It should be appreciated that a data set may include more or fewer data assets from the same or various paths as defined by the pattern associated with the bucket qualifier of a corresponding query. The data set 400 may, in some embodiments, be a subset of a larger data set (e.g., a data set stored in data store 116 of FIG. 1).

It should be appreciated that in some embodiments, data assets corresponding to a logical entity will share a single namespace hierarchy. For example, the pattern "%/{LogicalEntity:%}/???/YYYY/Mon/*, two logical entities named BikeTrips may be created, one under folder "No_A_Vehicle" and another under folder "Vehicle" even though the data assets under the relative logical entity path ( . . . /BikeTrips/???/YYYY/Mon/) may share the same pattern (also referred to as a schema). This is due to the data assets being under different namespace hierarchies.

Returning to FIG. 1, at 118, the expanded query 114 is executed against the data set stored in data store 116 (having folder structure 300). When executed, the expanded query 114 is used to identify the data set 400 based at least in part on matching the expanded query 114 to the file names of the data assets of data store 116. Thus, data set 400 may depict the subset of data assets that were identified as matching the pattern defined by the expanded query 114.

At 120, in accordance with the inclusion of the logical entity qualifier (e.g., "LogicalEntity:") of the query 108, one or more logical entities may be generated based at least in part on the results of executing the expanded query 114. For example, one or more logical entities may be generated using the data set 400. By way of example, executing the expanded query 114 against the data set 400 would create the following logical entities:
  yny_hourly_region_res_delayed
  hyd_hourly_region_res_delayed
  zrh_hourly_region_res_delayed
where each logical entity may be a label that represents a set of data assets that match the pattern in a particular manner. For example, the logical entity "yny_hourly_region_res_delayed" may represent a set of data assets (e.g., data assets 124) of data set 400 that include "yny_hourly_region_res_delayed" in the file name. Similarly, the other logical entities may represent corresponding sets of data assets (e.g., data assets 126 and 128, respectively). A single table (e.g., table 122), or separate corresponding tables may be used to store an association between each logical entity and the corresponding data assets that the logical entity represents. Thus, each data asset of the data assets 124 may be associated in the table 122 with the logical entity "yny_hourly_region_res_delayed", data assets 126 may be associated in the table 122 with "hyd_hourly_region_res_delayed", and data assets 128 may be associated in the table 122 with "zrh_hourly_region_res_delayed." The table 122 (or separate tables not depicted) may be stored in logical entity data store 129 for subsequent use. By way of example, a subsequent query may reference logical entities that match a particular pattern and the reference may be used to access/identify the data assets associated with the reference logical entity.

At 130, the labels 132 corresponding to the generated logical entities (e.g., "yny_hourly_region_res_delayed", "hyd_hourly_region_res_delayed", and "zrh_hourly_region_res_delayed") may be presented at the user device 110 via an interface provided by the data management computer(s) 102. The user is then enabled to view a condensed version of the data set and utilize the labels to reference individual sets of data assets corresponding to the logical entities. It should be appreciated that the expanded query 114 may be subsequently executed according to any suitable predefined schedule, periodicity, or frequency, upon request, upon change of the data set, or at any suitable time. Thus, in some embodiments, the table 122 (or individual tables corresponding to the logical entities) may be updated in real time as the data set changes.

Figure 5:
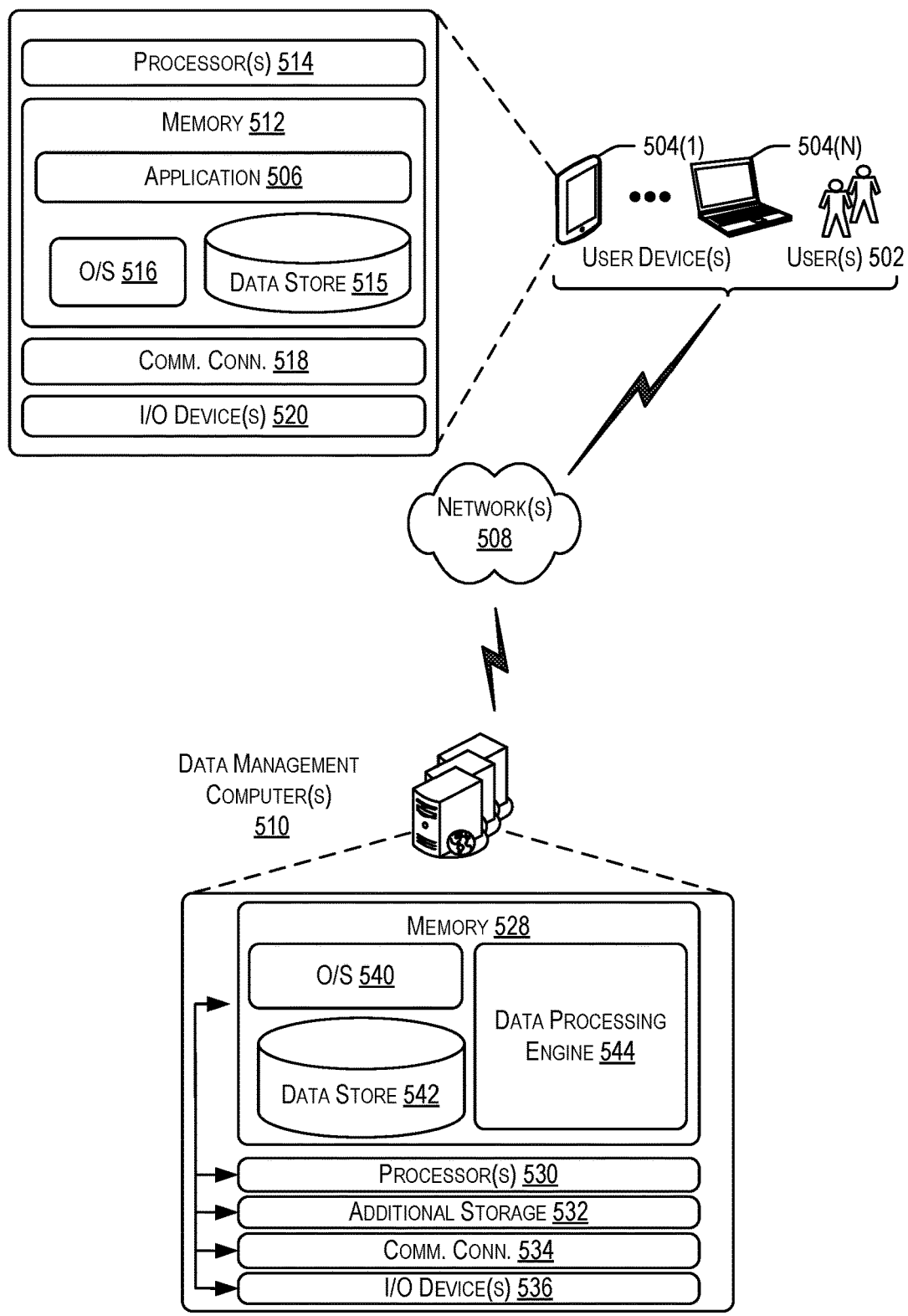
FIG. 5 illustrates components of a system, according to a particular embodiment.

FIG. 5 illustrates components of a system 500 according to a particular embodiment. In system 500, one or more user(s) 502 may utilize a user device (e.g., a user device of a collection of user device(s) 504, each an example of user device 110 of FIG. 1) to provide patterns and/or queries to data processing engine 544 executing on data management computer(s) 510 (e.g., the data management computer(s) 102 of FIG. 1). For example, the user may access a user interface accessible through an application 506 running on the user device(s) 504 via one or more network(s) 508. In some aspects, the application 506 operating on the user device(s) 504 may be hosted, managed, and/or provided by a computing resources service or service provider, such as by utilizing one or more data management computer(s) 510.

In some examples, the network(s) 508 may include any one or a combination of many different types of networks, such as cable networks, the Internet, wireless networks, cellular networks, and other private and/or public networks. While the illustrated example represents the user(s) 502 accessing application functionality over the network(s) 508, the described techniques may equally apply in instances where the user(s) 502 interact with the data management computer(s) 510 via the one or more user device(s) 504 over a landline phone, via a kiosk, or in any other suitable manner. It should be appreciated that the described techniques may apply in other client/server arrangements, as well as in non-client/server arrangements (e.g., locally stored applications, etc.). Additionally, in some embodiments, the data processing engine 544, discussed further below in more detail, may operate in whole or in part on the user device(s) 504. Thus, in some embodiments, the user(s) 502 may access the functionality of the data processing engine 544 directly through the user device(s) 504 and/or the data management computer(s) 510 via user interfaces provided by the data processing engine 544.

In some embodiments, the application 506 may allow the user(s) 502 to interact with the data management computer(s) 510. For example, a user may utilize the application 506 to specify user input defining one or more patterns. The application 506 may be configured to transmit (electronically convey) the user's input(s) to the data management computer(s) 510, operating at the user device(s) 504 and/or the data management computer(s) 510. The data management computer(s) 510 may in turn be configured to add, remove, or modify a pattern library (e.g., the pattern library 104 of FIG. 1) according to the user input(s). The application 506 may further be configured to receive, process, and/or display output corresponding to adding, removing, or modifying the pattern library. In some embodiments, the application 506 may be configured to transmit a user-defined query to the data processing engine 544 for processing and present, via I/O devices 520, any output generated by the data processing engine 544 in response to the query.

The data management computer(s) 510, perhaps arranged in a cluster of servers or as a server farm, may host the application 506 operating on the user device(s) 504 and/or cloud-based software services. Other server architectures may also be used to host the application 506 and/or cloud-based software services. The application 506 operating on the user device(s) 504 may be capable of handling requests from the user(s) 502 and serving, in response, various user interfaces that can be rendered at the user device(s) 504. The application 506 operating on the user device(s) 504 can present any suitable type of website that supports user interaction, including search engine sites and the like. The described techniques can similarly be implemented outside of the application 506, such as with other applications running on the user device(s) 504.

The user device(s) 504 may be any suitable type of computing device such as, but not limited to, a mobile phone, a hand-held scanner, a touch screen device, a smartphone, a personal digital assistant (PDA), a laptop computer, a desktop computer, a thin-client device, a tablet PC, an electronic book (e-book) reader, etc. In some examples, the user device(s) 504 may be in communication with the data management computer(s) 510 via the network(s) 508, or via other network connections.

In one illustrative configuration, the user device(s) 504 may include at least one memory 512 and one or more processing units (or processor(s)) 514. The processor(s) 514 may be implemented as appropriate in hardware, computer-executable instructions, firmware, or combinations thereof. Computer-executable instruction or firmware implementations of the processor(s) 514 may include computer-executable or machine-executable instructions written in any suitable programming language to perform the various functions described.

The memory 512 may store program instructions that are loadable and executable on the processor(s) 514, as well as data generated during the execution of these programs. Depending on the configuration and type of user computing device, the memory 512 may be volatile (such as random access memory (RAM)) and/or non-volatile (such as read-only memory (ROM), flash memory, etc.). The user device(s) 504 may also include additional removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 512 may include multiple different types of memory, such as static random access memory (SRAM), dynamic random access memory (DRAM), or ROM.

Turning to the contents of the memory 512 in more detail, the memory 512 may include an operating system 516, one or more data stores 515, and one or more application programs, modules, or services provided via the application 506 (e.g., a browser application, a video player application, etc.). The application 506 may be configured to receive, store, and/or display a network page or other interfaces for interacting with the data management computer(s) 510. The application 506 may include any suitable video player functionality for playing video content as streamed and/or otherwise provided by the data management computer(s) 510. Additionally, the memory 512 may store access credentials and/or other user information such as, but not limited to, user IDs, passwords, and/or other user information. In some examples, the user information may include information for authenticating an account access request such as, but not limited to, a device ID, a cookie, an IP address, a location, or the like.

The user device(s) 504 may also contain communications connection(s) 518 that allow the user device(s) 504 to communicate with a stored database, another computing device or server (e.g., the data management computer(s) 510), user terminals and/or other devices on the network(s) 508. The user device(s) 504 may also include I/O device(s) 520, such as a keyboard, a mouse, a pen, a voice input device, a touch input device, a display, speakers, a printer, etc.

In some aspects, the data management computer(s) 510 may also be any suitable type of computing devices such as, but not limited to, a mobile phone, a smart phone, a personal digital assistant (PDA), a laptop computer, a desktop computer, a server computer, a thin-client device, a tablet PC, etc. Additionally, it should be noted that in some embodiments, the data management computer(s) 510 are executed by one more virtual machines implemented in a hosted computing environment. The hosted computing environment may include one or more rapidly provisioned and released computing resources, which computing resources may include computing, networking and/or storage devices. A hosted computing environment may also be referred to as a cloud-computing environment. In some examples, the data management computer(s) 510 may be in communication with the user device(s) 504 and/or other service providers via the network(s) 508 or via other network connections. The data management computer(s) 510 may include one or more servers, perhaps arranged in a cluster, as a server farm, or as individual servers not associated with one another. These servers may be configured to implement the functionality described herein as part of an integrated, distributed computing environment.

In one illustrative configuration, the data management computer(s) 510 may include at least one memory 528 and one or more processing units (or processor(s)) 530. The processor(s) 530 may be implemented as appropriate in hardware, computer-executable instructions, firmware, or combinations thereof. Computer-executable instruction or firmware implementations of the processor(s) 530 may include computer-executable or machine-executable instructions written in any suitable programming language to perform the various functions described.

The memory 528 may store program instructions that are loadable and executable on the processor(s) 530, as well as data generated during the execution of these programs. Depending on the configuration and type of data management computer(s) 510, the memory 528 may be volatile (such as RAM) and/or non-volatile (such as ROM, flash memory, etc.). The data management computer(s) 510 or servers may also include additional storage 532, which may include removable storage and/or non-removable storage. The additional storage 532 may include, but is not limited to, magnetic storage, optical disks and/or tape storage. The disk drives and their associated computer-readable media may provide non-volatile storage of computer-readable instructions, data structures, program modules, and other data for the computing devices. In some implementations, the memory 528 may include multiple different types of memory, such as SRAM, DRAM, or ROM.

The memory 528, the additional storage 532, both removable and non-removable, are all examples of computer-readable storage media. For example, computer-readable storage media may include volatile or non-volatile, removable or non-removable media implemented in any method or technology for storage of information such as computer-readable instructions, data structures, program modules, or other data. The memory 528 and the additional storage 532 are all examples of computer storage media. Additional types of computer storage media that may be present in the data management computer(s) 510 may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, or any other medium which can be used to store the desired information and which can be accessed by the data management computer(s) 510. Combinations of any of the above should also be included within the scope of computer-readable media.

Alternatively, computer-readable communication media may include computer-readable instructions, program modules, or other data transmitted within a data signal, such as a carrier wave, or other transmission. However, as used herein, computer-readable storage media does not include computer-readable communication media.

The data management computer(s) 510 may also contain communications connection(s) 534 that allow the data management computer(s) 510 to communicate with a stored database, another computing device or server (e.g., content provider computer(s) 511), user terminals and/or other devices on the network(s) 508. The data management computer(s) 510 may also include I/O device(s) 536, such as a keyboard, a mouse, a pen, a voice input device, a touch input device, a display, speakers, a printer, etc.

Turning to the contents of the memory 528 in more detail, the memory 528 may include an operating system 540, one or more data stores 542, and/or one or more application programs, modules, or services for implementing the features disclosed herein, such as the features provided by the data processing engine 544. The data processing engine 544 may be configured to perform the operations discussed above in connection with FIG. 1.

Figure 6:
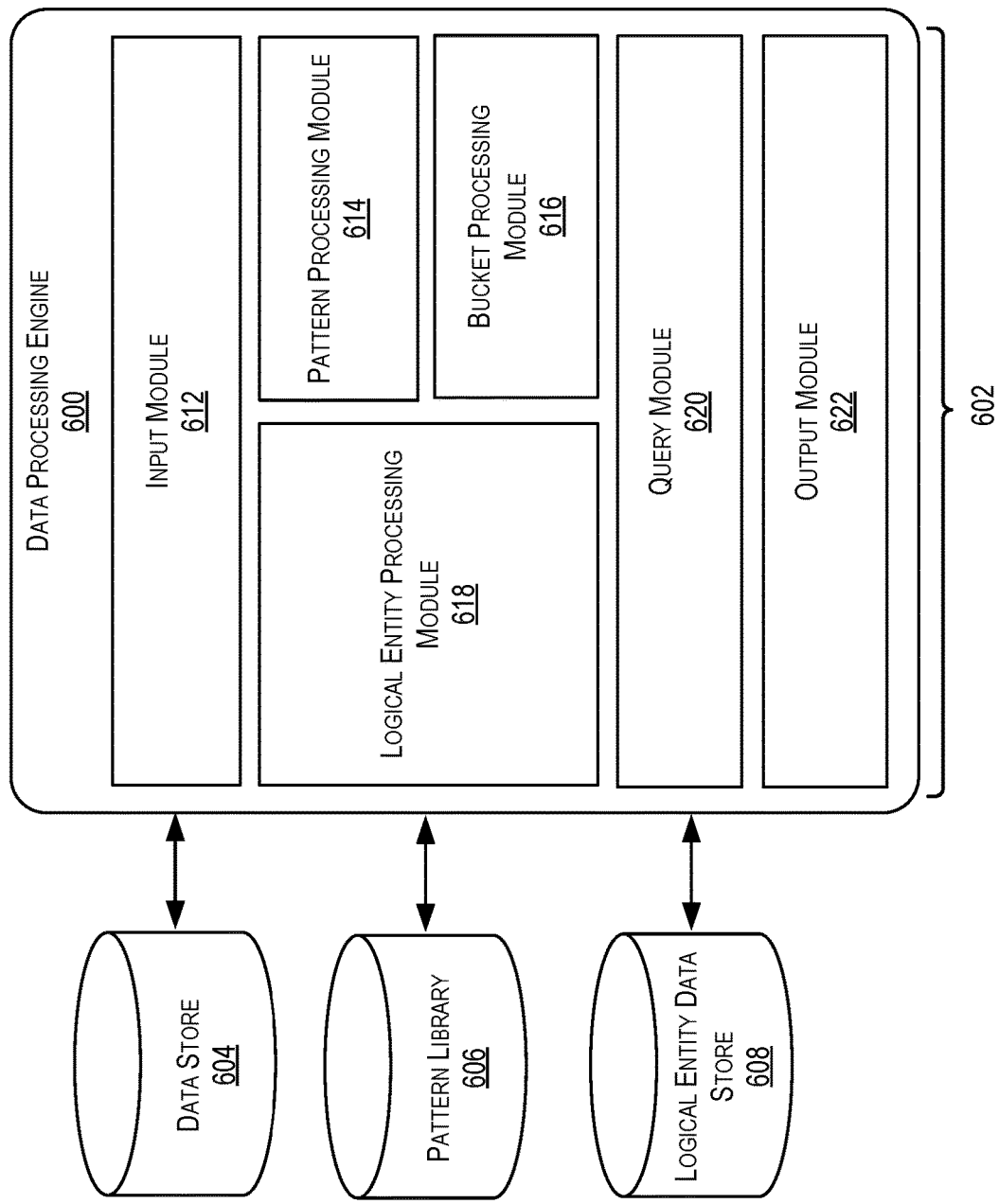
FIG. 6 is a schematic diagram of an example computer architecture for a data processing engine, including a plurality of modules that may perform functions in accordance with at least one embodiment.

FIG. 6 is a schematic diagram of an example computer architecture for data processing engine 600 (e.g., the data processing engine 544 of FIG. 5), including a plurality of modules 602 that may perform functions in accordance with at least one embodiment. The modules 602 may be software modules, hardware modules, or a combination thereof. If the modules 602 are software modules, the modules 602 can be embodied on a computer readable medium and processed by a processor in any of the computer systems described herein. It should be noted that any module or data store described herein, may be, in some embodiments, be a service responsible for managing data of the type required to make corresponding calculations. The modules 602 may be exist as part of the data management computer(s) 510 of FIG. 5 (or a separate computing resource) operating within the system 500 of FIG. 5, or the modules may exist as separate modules or services external to the system 500.

In the embodiment shown in the FIG. 6, data store 604 (e.g., an example of the data store 116 of FIG. 1), pattern library 606 (e.g., an example of the pattern library 104 of FIG. 1), and logical entity data store 608 (e.g., an example of the logical entity data store 129 of FIG. 1) are shown, although content data can be maintained, derived, or otherwise accessed from various data stores, either remote or local to data processing engine 600, to achieve the functions described herein. In at least one embodiment, the data stores described herein may operate as part of the system 500 or may be physically distinct from the system 500. Data processing engine 600, as shown in FIG. 6, includes various modules such as input module 612, pattern processing module 614, bucket processing module 616, logical entity processing module 618, and an output module 620. Some functions of the modules 602 are described below. However, for the benefit of the reader, a brief, non-limiting description of each of the modules is provided in the following paragraphs.

In at least one embodiment, data processing engine 600 includes the input module 612. Generally, the input module 612 may be utilized to receive any suitable information with respect to any example provided herein. The input module 612 may include any suitable number of application programming interfaces with which the functionality of data processing engine 600 may be invoked. By way of example, the input module 612 may receive user input (e.g., add, delete, modify requests) corresponding to one or more pattern definitions and/or one or more queries. The input module 612 may be configured to communicate with the other modules of modules 602 in order to pass data between modules and/or to invoke the functionality of said modules. In some embodiments, the input module 612 may receive user input adding, removing, and/or modifying one or more patterns. In accordance with the user input, the input module 612 may provide the user input to the pattern processing module 614 for processing. Similarly, the input module 612 may be configured to receive user input specifying a query and may pass the user input to the pattern processing module 614, the bucket processing module 616, and/or the logical entity processing module 618 for further processing.

The pattern processing module 614 may be configured to execute any suitable operations corresponding to adding, deleting, and/or modifying patterns of the pattern library 104 according to received user input. For example, a user may define pattern 100 of FIG. 2 via user input provided at the user device 110 of FIG. 1. The user input defining the pattern 100 may be stored in the pattern library 606 for subsequent use. In some embodiments, the pattern processing module 614 may execute any suitable operations for expanding a query (e.g., query 108 of FIG. 1) to an expanded query (e.g., expanded query 114 of FIG. 1) using any suitable pattern defined in pattern library 606. Thus, pattern names and/or other identifiers may be included in a query, and the pattern processing module 614 may generate an expanded query by replacing these pattern names/identifiers with the corresponding expressions associated with those pattern names/identifier as described above in connection with FIG. 1. In some embodiments, the functionality of the bucket processing module 616, the logical entity processing module 618, and/or the output module 620 may be invoked by the pattern processing module 614.

The bucket processing module 616 may be configured to identify a bucket qualifier from a received query (and/or an expanded query). For example, the bucket processing module 616 may be configured to set one or more variables to any suitable value to identify one or more paths (and/or folders) against which the expanded query may be executed.

The logical entity processing module 618 may be configured to execute any suitable operations to generate one or more logical entities according to received user input. By way of example, the logical entity processing module 618 can parse the query to identify one or more logical entity qualifiers (e.g., "LogicalEntity:"). Once identified, the logical entity processing module 618 may maintain a list of logical entities (e.g., labels) available for the data set. In some embodiments, the logical entity processing module 618 may be configured to generate and/or maintain one or more tables corresponding to the logical entities (e.g., table 122 of FIG. 1). In some embodiments, the logical entity processing module 618 may maintain a single table for all logical entities, or one table for each logical entity. Each table may define associations between a given logical entity and one or more data assets the given logical entity represents. In some embodiments, the table(s) may be stored in logical entity data store 608 by logical entity processing module 618. In subsequent queries that reference a previously existing logical entity, the logical entity processing module 618 may be configured to access the table(s) in order to identify the data assets associated with the provided logical entity such that the operations provided in the user input may be performed based at least in part on identify the set of data assets by logical entity (e.g., by label).

The query module 620 may be configured to execute the expanded query identified by the pattern processing module 614 against the data set defined by the output of bucket processing module 616. Based on the results obtained from this execution, the query module 620 may invoke the functionality of logical entity processing module 618 to generate one or more logical entities and/or corresponding table(s). In some embodiments, the query module 620 may be configured to receive logical entity labels/identifiers and/or tables from the logical entity processing module 618. The query module 620 may provide query results (e.g., data asset identifiers, logical entity labels and/or tables, etc.) to the output module 622 for processing.

The output module 622 may be configured to output any suitable data provided by the other modules 602. For example, the output module 622 may receive data asset identifiers, logical entity labels and/or tables, or feedback from adding/removing/modifying a pattern. The output module 622 may be configured to output query results, lists of labels, one or more logical entity tables (e.g., lists of data assets associated with one or more respective logical entities), or the like. In some embodiments, the output module 622 may filter other data assets not identified from view such that the user is able to define the data assets that are, for him, viewable based at least in part on the pattern, bucket, and/or logical entity qualifiers used.

Figure 7:
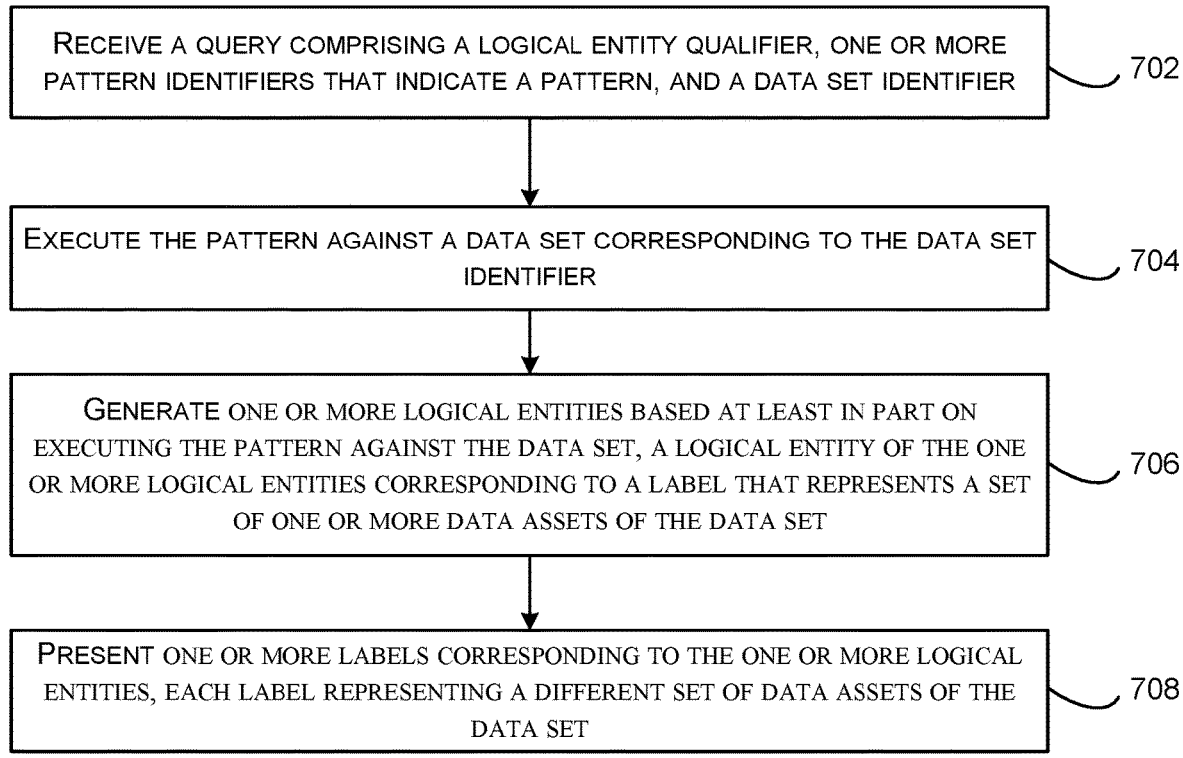
FIG. 7 depicts a flowchart illustrating an example of a method for generating one or more logical entities, in accordance with at least one embodiment.

FIG. 7 depicts a flowchart illustrating an example of a method 700 for generating one or more logical entities, in accordance with at least one embodiment. In some embodiments, the operations of method 700 may be performed by the data processing engine 600 of FIG. 6 operating as a computing service or executing on a computing device within the system 500 of FIG. 5.

The method 700 may begin at block 702, where a query is received by a computing device (e.g., the data management computer(s) 510 of FIG. 5). In some embodiments, the query comprises a logical entity qualifier (e.g., "LogicalEntity:"), one or more pattern identifiers that indicate a pattern (e.g., "Pattern:" indicating inclusion of a pattern), and a data set identifier (e.g., "Bucket:").

At 704, the computing device (e.g., the query module 620) executes the pattern against a data set corresponding to the data set identifier. In some embodiments, the pattern processing module 614 of FIG. 6 is utilized to retrieve various portions of the pattern from a pattern library (e.g., the pattern library 606 of FIG. 6). The bucket processing module 616 may be utilized to identify the path and/or location of the data set against which the pattern (or a query including the pattern) is executed.

At 706, one or more logical entities may be generated by the computing device in real time based at least in part on executing the pattern against the data set. In some embodiments, a logical entity of the one or more logical entities corresponds to a label that represents a set of one or more data assets of the data set.

At 708, one or more labels corresponding to the one or more logical entities may be presented (e.g., at the user device 110 of FIG. 1). In some embodiments, each label presented represents a different set of data assets of the data set.

As noted above, infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (e.g., billing, monitoring, logging, security, load balancing and clustering, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different problems for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more security group rules provisioned to define how the security of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

Figure 8:
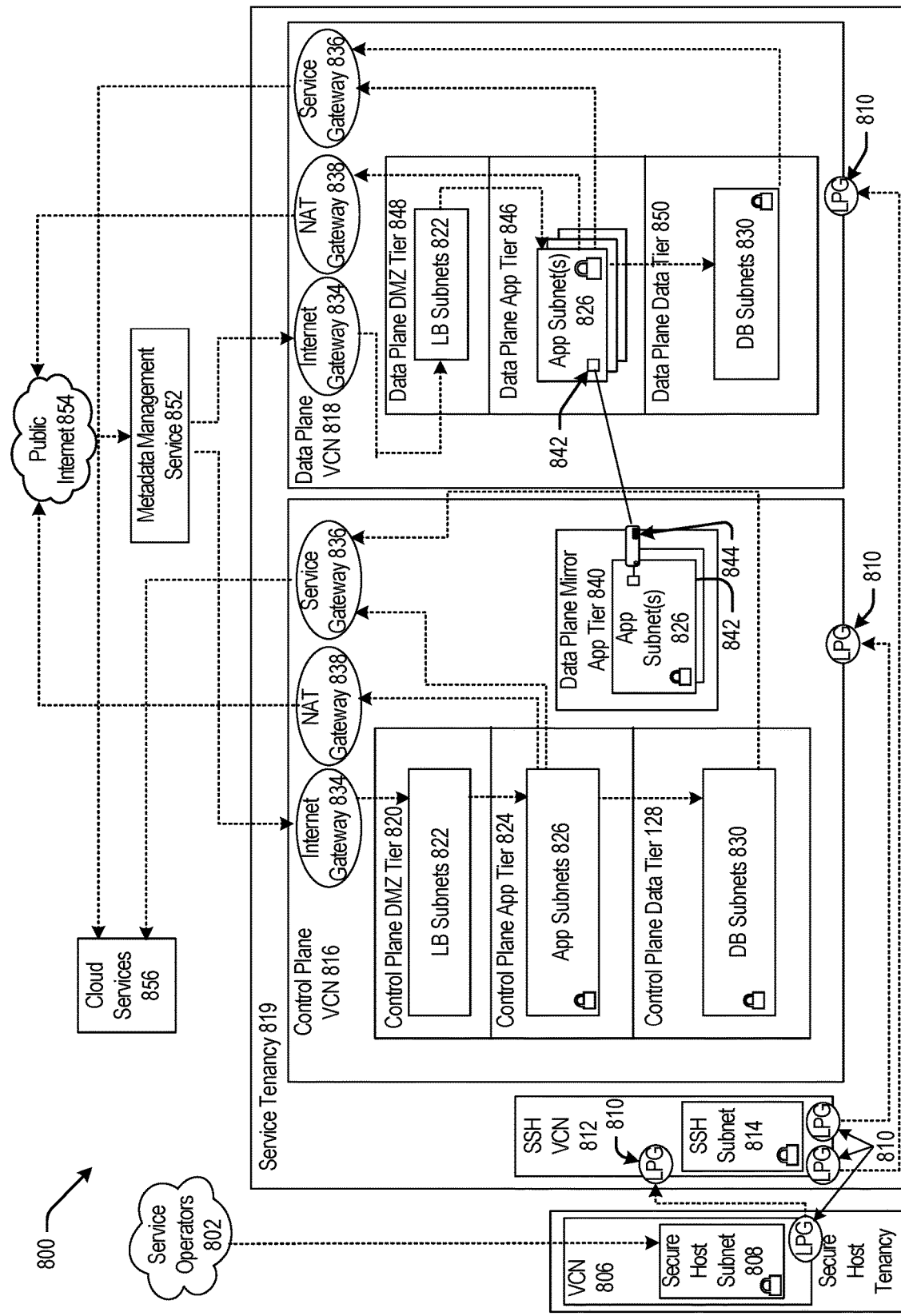
FIG. 8 is a block diagram illustrating one pattern for implementing a cloud infrastructure as a service system, according to at least one embodiment.

FIG. 8 is a block diagram 800 illustrating an example pattern of an IaaS architecture, according to at least one embodiment. Service operators 802 can be communicatively coupled to a secure host tenancy 804 that can include a virtual cloud network (VCN) 806 and a secure host subnet 808. In some examples, the service operators 802 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 806 and/or the Internet.

The VCN 806 can include a local peering gateway (LPG) 810 that can be communicatively coupled to a secure shell (SSH) VCN 812 via an LPG 810 contained in the SSH VCN 812. The SSH VCN 812 can include an SSH subnet 814, and the SSH VCN 812 can be communicatively coupled to a control plane VCN 816 via the LPG 810 contained in the control plane VCN 816. Also, the SSH VCN 812 can be communicatively coupled to a data plane VCN 818 via an LPG 810. The control plane VCN 816 and the data plane VCN 818 can be contained in a service tenancy 819 that can be owned and/or operated by the IaaS provider.

The control plane VCN 816 can include a control plane demilitarized zone (DMZ) tier 820 that acts as a perimeter network (e.g., portions of a corporate network between the corporate intranet and external networks). The DMZ-based servers may have restricted responsibilities and help keep security breaches contained. Additionally, the DMZ tier 820 can include one or more load balancer (LB) subnet(s) 822, a control plane app tier 824 that can include app subnet(s) 826, a control plane data tier 828 that can include database (DB) subnet(s) 830 (e.g., frontend DB subnet(s) and/or backend DB subnet(s)). The LB subnet(s) 822 contained in the control plane DMZ tier 820 can be communicatively coupled to the app subnet(s) 826 contained in the control plane app tier 824 and an Internet gateway 834 that can be contained in the control plane VCN 816, and the app subnet(s) 826 can be communicatively coupled to the DB subnet(s) 830 contained in the control plane data tier 828 and a service gateway 836 and a network address translation (NAT) gateway 838. The control plane VCN 816 can include the service gateway 836 and the NAT gateway 838.

The control plane VCN 816 can include a data plane mirror app tier 840 that can include app subnet(s) 826. The app subnet(s) 826 contained in the data plane mirror app tier 840 can include a virtual network interface controller (VNIC) 842 that can execute a compute instance 844. The compute instance 844 can communicatively couple the app subnet(s) 826 of the data plane mirror app tier 840 to app subnet(s) 826 that can be contained in a data plane app tier 846.

The data plane VCN 818 can include the data plane app tier 846, a data plane DMZ tier 848, and a data plane data tier 850. The data plane DMZ tier 848 can include LB subnet(s) 822 that can be communicatively coupled to the app subnet(s) 826 of the data plane app tier 846 and the Internet gateway 834 of the data plane VCN 818. The app subnet(s) 826 can be communicatively coupled to the service gateway 836 of the data plane VCN 818 and the NAT gateway 838 of the data plane VCN 818. The data plane data tier 850 can also include the DB subnet(s) 830 that can be communicatively coupled to the app subnet(s) 826 of the data plane app tier 846.

The Internet gateway 834 of the control plane VCN 816 and of the data plane VCN 818 can be communicatively coupled to a metadata management service 852 that can be communicatively coupled to public Internet 854. Public Internet 854 can be communicatively coupled to the NAT gateway 838 of the control plane VCN 816 and of the data plane VCN 818. The service gateway 836 of the control plane VCN 816 and of the data plane VCN 818 can be communicatively couple to cloud services 856.

In some examples, the service gateway 836 of the control plane VCN 816 or of the data plane VCN 818 can make application programming interface (API) calls to cloud services 856 without going through public Internet 854. The API calls to cloud services 856 from the service gateway 836 can be one-way: the service gateway 836 can make API calls to cloud services 856, and cloud services 856 can send requested data to the service gateway 836. But, cloud services 856 may not initiate API calls to the service gateway 836.

In some examples, the secure host tenancy 804 can be directly connected to the service tenancy 819, which may be otherwise isolated. The secure host subnet 808 can communicate with the SSH subnet 814 through an LPG 810 that may enable two-way communication over an otherwise isolated system. Connecting the secure host subnet 808 to the SSH subnet 814 may give the secure host subnet 808 access to other entities within the service tenancy 819.

The control plane VCN 816 may allow users of the service tenancy 819 to set up or otherwise provision desired resources. Desired resources provisioned in the control plane VCN 816 may be deployed or otherwise used in the data plane VCN 818. In some examples, the control plane VCN 816 can be isolated from the data plane VCN 818, and the data plane mirror app tier 840 of the control plane VCN 816 can communicate with the data plane app tier 846 of the data plane VCN 818 via VNICs 842 that can be contained in the data plane mirror app tier 840 and the data plane app tier 846.

In some examples, users of the system, or customers, can make requests, for example create, read, update, or delete (CRUD) operations, through public Internet 854 that can communicate the requests to the metadata management service 852. The metadata management service 852 can communicate the request to the control plane VCN 816 through the Internet gateway 834. The request can be received by the LB subnet(s) 822 contained in the control plane DMZ tier 820. The LB subnet(s) 822 may determine that the request is valid, and in response to this determination, the LB subnet(s) 822 can transmit the request to app subnet(s) 826 contained in the control plane app tier 824. If the request is validated and requires a call to public Internet 854, the call to public Internet 854 may be transmitted to the NAT gateway 838 that can make the call to public Internet 854. Memory that may be desired to be stored by the request can be stored in the DB subnet(s) 830.

In some examples, the data plane mirror app tier 840 can facilitate direct communication between the control plane VCN 816 and the data plane VCN 818. For example, changes, updates, or other suitable modifications to configuration may be desired to be applied to the resources contained in the data plane VCN 818. Via a VNIC 842, the control plane VCN 816 can directly communicate with, and can thereby execute the changes, updates, or other suitable modifications to configuration to, resources contained in the data plane VCN 818.

In some embodiments, the control plane VCN 816 and the data plane VCN 818 can be contained in the service tenancy 819. In this case, the user, or the customer, of the system may not own or operate either the control plane VCN 816 or the data plane VCN 818. Instead, the IaaS provider may own or operate the control plane VCN 816 and the data plane VCN 818, both of which may be contained in the service tenancy 819. This embodiment can enable isolation of networks that may prevent users or customers from interacting with other users', or other customers', resources. Also, this embodiment may allow users or customers of the system to store databases privately without needing to rely on public Internet 854, which may not have a desired level of security, for storage.

In other embodiments, the LB subnet(s) 822 contained in the control plane VCN 816 can be configured to receive a signal from the service gateway 836. In this embodiment, the control plane VCN 816 and the data plane VCN 818 may be configured to be called by a customer of the IaaS provider without calling public Internet 854. Customers of the IaaS provider may desire this embodiment since database(s) that the customers use may be controlled by the IaaS provider and may be stored on the service tenancy 819, which may be isolated from public Internet 854.

Figure 9:
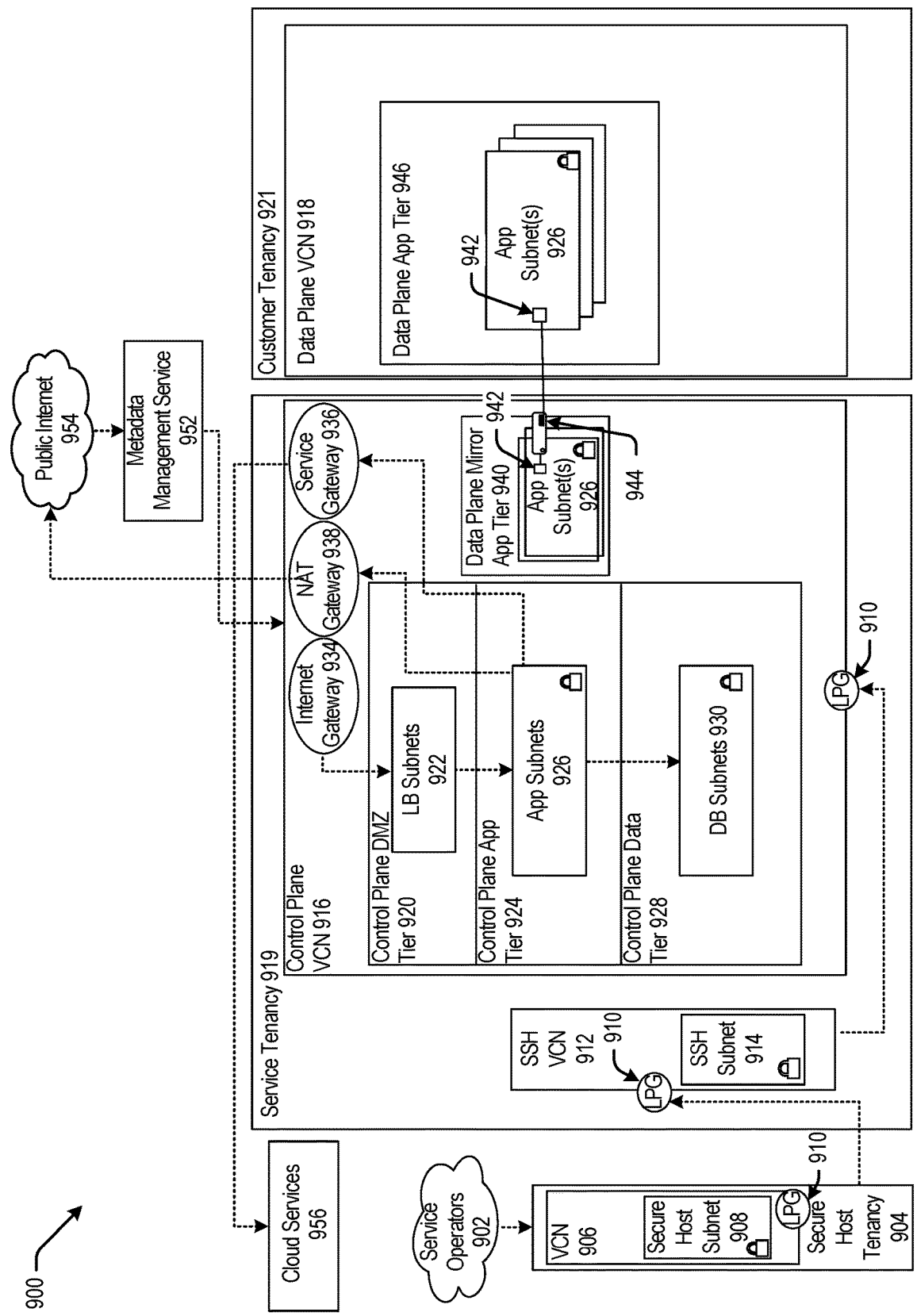
FIG. 9 is a block diagram illustrating another pattern for implementing a cloud infrastructure as a service system, according to at least one embodiment.

FIG. 9 is a block diagram 900 illustrating another example pattern of an IaaS architecture, according to at least one embodiment. Service operators 902 (e.g. service operators 802 of FIG. 8) can be communicatively coupled to a secure host tenancy 904 (e.g. the secure host tenancy 804 of FIG. 8) that can include a virtual cloud network (VCN) 906 (e.g. the VCN 806 of FIG. 8) and a secure host subnet 908 (e.g. the secure host subnet 808 of FIG. 8). The VCN 906 can include a local peering gateway (LPG) 910 (e.g. the LPG 810 of FIG. 8) that can be communicatively coupled to a secure shell (SSH) VCN 912 (e.g. the SSH VCN 812 of FIG. 8) via an LPG 810 contained in the SSH VCN 912. The SSH VCN 912 can include an SSH subnet 914 (e.g. the SSH subnet 814 of FIG. 8), and the SSH VCN 912 can be communicatively coupled to a control plane VCN 916 (e.g. the control plane VCN 816 of FIG. 8) via an LPG 910 contained in the control plane VCN 916. The control plane VCN 916 can be contained in a service tenancy 919 (e.g. the service tenancy 819 of FIG. 8), and the data plane VCN 918 (e.g. the data plane VCN 818 of FIG. 8) can be contained in a customer tenancy 921 that may be owned or operated by users, or customers, of the system.

The control plane VCN 916 can include a control plane DMZ tier 920 (e.g. the control plane DMZ tier 820 of FIG. 8) that can include LB subnet(s) 922 (e.g. LB subnet(s) 822 of FIG. 8), a control plane app tier 924 (e.g. the control plane app tier 824 of FIG. 8) that can include app subnet(s) 926 (e.g. app subnet(s) 826 of FIG. 8), a control plane data tier 928 (e.g. the control plane data tier 828 of FIG. 8) that can include database (DB) subnet(s) 930 (e.g. similar to DB subnet(s) 830 of FIG. 8). The LB subnet(s) 922 contained in the control plane DMZ tier 920 can be communicatively coupled to the app subnet(s) 926 contained in the control plane app tier 924 and an Internet gateway 934 (e.g. the Internet gateway 834 of FIG. 8) that can be contained in the control plane VCN 916, and the app subnet(s) 926 can be communicatively coupled to the DB subnet(s) 930 contained in the control plane data tier 928 and a service gateway 936 (e.g. the service gateway of FIG. 8) and a network address translation (NAT) gateway 938 (e.g. the NAT gateway 838 of FIG. 8). The control plane VCN 916 can include the service gateway 936 and the NAT gateway 938.

The control plane VCN 916 can include a data plane mirror app tier 940 (e.g. the data plane mirror app tier 840 of FIG. 8) that can include app subnet(s) 926. The app subnet(s) 926 contained in the data plane mirror app tier 940 can include a virtual network interface controller (VNIC) 942 (e.g. the VNIC of 842) that can execute a compute instance 944 (e.g. similar to the compute instance 844 of FIG. 8). The compute instance 944 can facilitate communication between the app subnet(s) 926 of the data plane mirror app tier 940 and the app subnet(s) 926 that can be contained in a data plane app tier 946 (e.g. the data plane app tier 846 of FIG. 8) via the VNIC 942 contained in the data plane mirror app tier 940 and the VNIC 942 contained in the data plane app tier 946.

The Internet gateway 934 contained in the control plane VCN 916 can be communicatively coupled to a metadata management service 952 (e.g. the metadata management service 852 of FIG. 8) that can be communicatively coupled to public Internet 954 (e.g. public Internet 854 of FIG. 8). Public Internet 954 can be communicatively coupled to the NAT gateway 938 contained in the control plane VCN 916. The service gateway 936 contained in the control plane VCN 916 can be communicatively couple to cloud services 956 (e.g. cloud services 856 of FIG. 8).

In some examples, the data plane VCN 918 can be contained in the customer tenancy 921. In this case, the IaaS provider may provide the control plane VCN 916 for each customer, and the IaaS provider may, for each customer, set up a unique compute instance 944 that is contained in the service tenancy 919. Each compute instance 944 may allow communication between the control plane VCN 916, contained in the service tenancy 919, and the data plane VCN 918 that is contained in the customer tenancy 921. The compute instance 944 may allow resources, that are provisioned in the control plane VCN 916 that is contained in the service tenancy 919, to be deployed or otherwise used in the data plane VCN 918 that is contained in the customer tenancy 921.

In other examples, the customer of the IaaS provider may have databases that live in the customer tenancy 921. In this example, the control plane VCN 916 can include the data plane mirror app tier 940 that can include app subnet(s) 926. The data plane mirror app tier 940 can reside in the data plane VCN 918, but the data plane mirror app tier 940 may not live in the data plane VCN 918. That is, the data plane mirror app tier 940 may have access to the customer tenancy 921, but the data plane mirror app tier 940 may not exist in the data plane VCN 918 or be owned or operated by the customer of the IaaS provider. The data plane mirror app tier 940 may be configured to make calls to the data plane VCN 918 but may not be configured to make calls to any entity contained in the control plane VCN 916. The customer may desire to deploy or otherwise use resources in the data plane VCN 918 that are provisioned in the control plane VCN 916, and the data plane mirror app tier 940 can facilitate the desired deployment, or other usage of resources, of the customer.

In some embodiments, the customer of the IaaS provider can apply filters to the data plane VCN 918. In this embodiment, the customer can determine what the data plane VCN 918 can access, and the customer may restrict access to public Internet 954 from the data plane VCN 918. The IaaS provider may not be able to apply filters or otherwise control access of the data plane VCN 918 to any outside networks or databases. Applying filters and controls by the customer onto the data plane VCN 918, contained in the customer tenancy 921, can help isolate the data plane VCN 918 from other customers and from public Internet 954.

In some embodiments, cloud services 956 can be called by the service gateway 936 to access services that may not exist on public Internet 954, on the control plane VCN 916, or on the data plane VCN 918. The connection between cloud services 956 and the control plane VCN 916 or the data plane VCN 918 may not be live or continuous. Cloud services 956 may exist on a different network owned or operated by the IaaS provider. Cloud services 956 may be configured to receive calls from the service gateway 936 and may be configured to not receive calls from public Internet 954. Some cloud services 956 may be isolated from other cloud services 956, and the control plane VCN 916 may be isolated from cloud services 956 that may not be in the same region as the control plane VCN 916. For example, the control plane VCN 916 may be located in "Region 1," and cloud service "Deployment 8," may be located in Region 1 and in "Region 2." If a call to Deployment 8 is made by the service gateway 936 contained in the control plane VCN 916 located in Region 1, the call may be transmitted to Deployment 8 in Region 1. In this example, the control plane VCN 916, or Deployment 8 in Region 1, may not be communicatively coupled to, or otherwise in communication with, Deployment 8 in Region 2.

Figure 10:
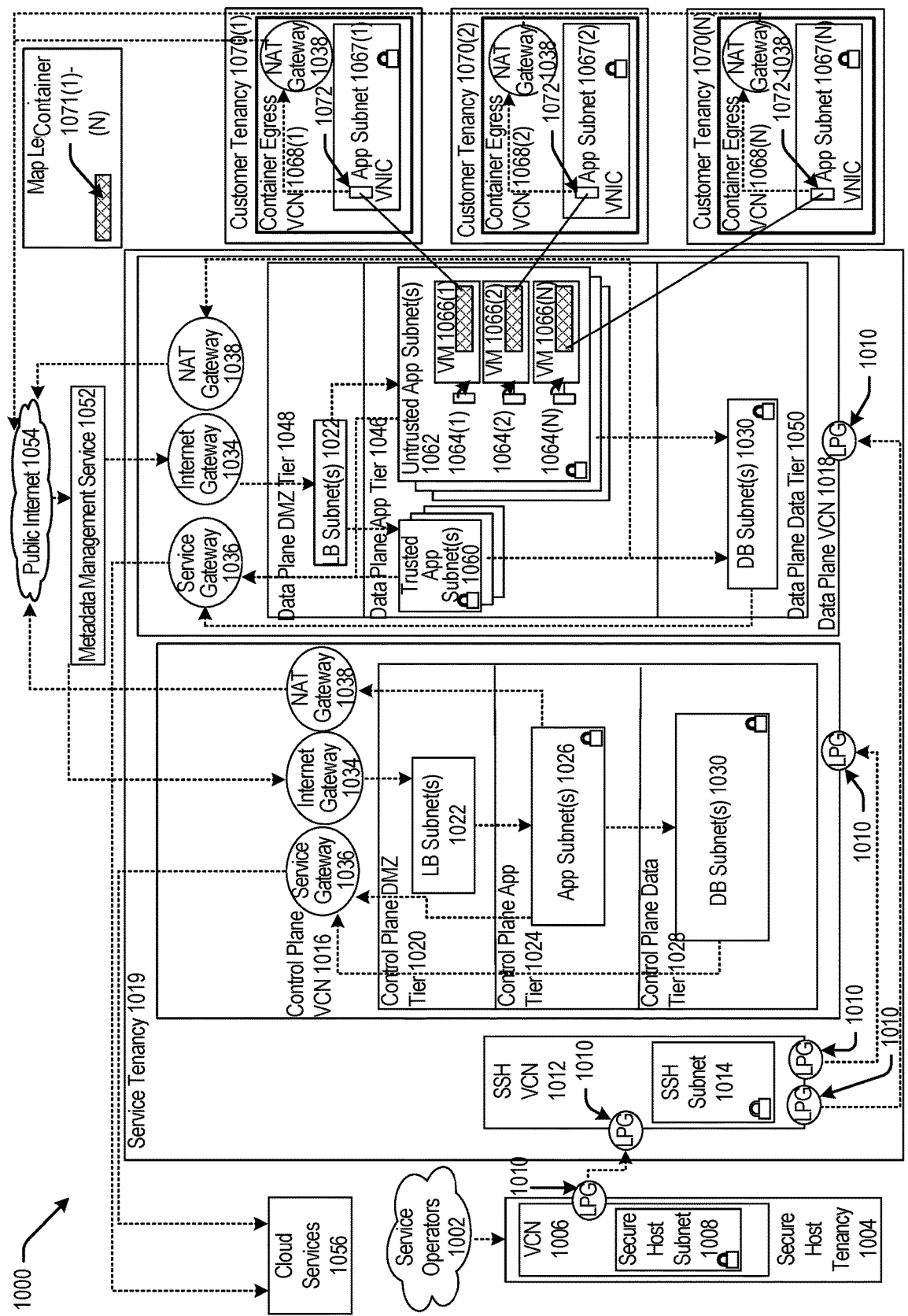
FIG. 10 is a block diagram illustrating another pattern for implementing a cloud infrastructure as a service system, according to at least one embodiment.

FIG. 10 is a block diagram 1000 illustrating another example pattern of an IaaS architecture, according to at least one embodiment. Service operators 1002 (e.g. service operators 802 of FIG. 8) can be communicatively coupled to a secure host tenancy 1004 (e.g. the secure host tenancy 804 of FIG. 8) that can include a virtual cloud network (VCN) 1006 (e.g. the VCN 806 of FIG. 8) and a secure host subnet 1008 (e.g. the secure host subnet 808 of FIG. 8). The VCN 1006 can include an LPG 1010 (e.g. the LPG 810 of FIG. 8) that can be communicatively coupled to an SSH VCN 1012 (e.g. the SSH VCN 812 of FIG. 8) via an LPG 1010 contained in the SSH VCN 1012. The SSH VCN 1012 can include an SSH subnet 1014 (e.g. the SSH subnet 814 of FIG. 8), and the SSH VCN 1012 can be communicatively coupled to a control plane VCN 1016 (e.g. the control plane VCN 816 of FIG. 8) via an LPG 1010 contained in the control plane VCN 1016 and to a data plane VCN 1018 (e.g. the data plane 818 of FIG. 8) via an LPG 1010 contained in the data plane VCN 1018. The control plane VCN 1016 and the data plane VCN 1018 can be contained in a service tenancy 1019 (e.g. the service tenancy 819 of FIG. 8).

The control plane VCN 1016 can include a control plane DMZ tier 1020 (e.g. the control plane DMZ tier 820 of FIG. 8) that can include load balancer (LB) subnet(s) 1022 (e.g. LB subnet(s) 822 of FIG. 8), a control plane app tier 1024 (e.g. the control plane app tier 824 of FIG. 8) that can include app subnet(s) 1026 (e.g. similar to app subnet(s) 826 of FIG. 8), a control plane data tier 1028 (e.g. the control plane data tier 828 of FIG. 8) that can include DB subnet(s) 1030. The LB subnet(s) 1022 contained in the control plane DMZ tier 1020 can be communicatively coupled to the app subnet(s) 1026 contained in the control plane app tier 1024 and to an Internet gateway 1034 (e.g. the Internet gateway 834 of FIG. 8) that can be contained in the control plane VCN 1016, and the app subnet(s) 1026 can be communicatively coupled to the DB subnet(s) 1030 contained in the control plane data tier 1028 and to a service gateway 1036 (e.g. the service gateway of FIG. 8) and a network address translation (NAT) gateway 1038 (e.g. the NAT gateway 838 of FIG. 8). The control plane VCN 1016 can include the service gateway 1036 and the NAT gateway 1038.

The data plane VCN 1018 can include a data plane app tier 1046 (e.g. the data plane app tier 846 of FIG. 8), a data plane DMZ tier 1048 (e.g. the data plane DMZ tier 848 of FIG. 8), and a data plane data tier 1050 (e.g. the data plane data tier 850 of FIG. 8). The data plane DMZ tier 1048 can include LB subnet(s) 1022 that can be communicatively coupled to trusted app subnet(s) 1060 and untrusted app subnet(s) 1062 of the data plane app tier 1046 and the Internet gateway 1034 contained in the data plane VCN 1018. The trusted app subnet(s) 1060 can be communicatively coupled to the service gateway 1036 contained in the data plane VCN 1018, the NAT gateway 1038 contained in the data plane VCN 1018, and DB subnet(s) 1030 contained in the data plane data tier 1050. The untrusted app subnet(s) 1062 can be communicatively coupled to the service gateway 1036 contained in the data plane VCN 1018 and DB subnet(s) 1030 contained in the data plane data tier 1050. The data plane data tier 1050 can include DB subnet(s) 1030 that can be communicatively coupled to the service gateway 1036 contained in the data plane VCN 1018.

The untrusted app subnet(s) 1062 can include one or more primary VNICs 1064(1)-(N) that can be communicatively coupled to tenant virtual machines (VMs) 1066(1)-(N). Each tenant VM 1066(1)-(N) can be communicatively coupled to a respective app subnet 1067(1)-(N) that can be contained in respective container egress VCNs 1068(1)-(N) that can be contained in respective customer tenancies 1070(1)-(N). Respective secondary VNICs 1072(1)-(N) can facilitate communication between the untrusted app subnet(s) 1062 contained in the data plane VCN 1018 and the app subnet contained in the container egress VCNs 1068(1)-(N). Each container egress VCNs 1068(1)-(N) can include a NAT gateway 1038 that can be communicatively coupled to public Internet 1054 (e.g. public Internet 854 of FIG. 8).

The Internet gateway 1034 contained in the control plane VCN 1016 and contained in the data plane VCN 1018 can be communicatively coupled to a metadata management service 1052 (e.g. the metadata management system 852 of FIG. 8) that can be communicatively coupled to public Internet 1054. Public Internet 1054 can be communicatively coupled to the NAT gateway 1038 contained in the control plane VCN 1016 and contained in the data plane VCN 1018. The service gateway 1036 contained in the control plane VCN 1016 and contained in the data plane VCN 1018 can be communicatively couple to cloud services 1056.

In some embodiments, the data plane VCN 1018 can be integrated with customer tenancies 1070. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane tier app 1046. Code to run the function may be executed in the VMs 1066(1)-(N), and the code may not be configured to run anywhere else on the data plane VCN 1018. Each VM 1066(1)-(N) may be connected to one customer tenancy 1070. Respective containers 1071(1)-(N) contained in the VMs 1066(1)-(N) may be configured to run the code. In this case, there can be a dual isolation (e.g., the containers 1071(1)-(N) running code, where the containers 1071(1)-(N) may be contained in at least the VM 1066(1)-(N) that are contained in the untrusted app subnet(s) 1062), which may help prevent incorrect or otherwise undesirable code from damaging the network of the IaaS provider or from damaging a network of a different customer. The containers 1071(1)-(N) may be communicatively coupled to the customer tenancy 1070 and may be configured to transmit or receive data from the customer tenancy 1070. The containers 1071(1)-(N) may not be configured to transmit or receive data from any other entity in the data plane VCN 1018. Upon completion of running the code, the IaaS provider may kill or otherwise dispose of the containers 1071(1)-(N).

In some embodiments, the trusted app subnet(s) 1060 may run code that may be owned or operated by the IaaS provider. In this embodiment, the trusted app subnet(s) 1060 may be communicatively coupled to the DB subnet(s) 1030 and be configured to execute CRUD operations in the DB subnet(s) 1030. The untrusted app subnet(s) 1062 may be communicatively coupled to the DB subnet(s) 1030, but in this embodiment, the untrusted app subnet(s) may be configured to execute read operations in the DB subnet(s) 1030. The containers 1071(1)-(N) that can be contained in the VM 1066(1)-(N) of each customer and that may run code from the customer may not be communicatively coupled with the DB subnet(s) 1030.

In other embodiments, the control plane VCN 1016 and the data plane VCN 1018 may not be directly communicatively coupled. In this embodiment, there may be no direct communication between the control plane VCN 1016 and the data plane VCN 1018. However, communication can occur indirectly through at least one method. An LPG 1010 may be established by the IaaS provider that can facilitate communication between the control plane VCN 1016 and the data plane VCN 1018. In another example, the control plane VCN 1016 or the data plane VCN 1018 can make a call to cloud services 1056 via the service gateway 1036. For example, a call to cloud services 1056 from the control plane VCN 1016 can include a request for a service that can communicate with the data plane VCN 1018.

Figure 11:
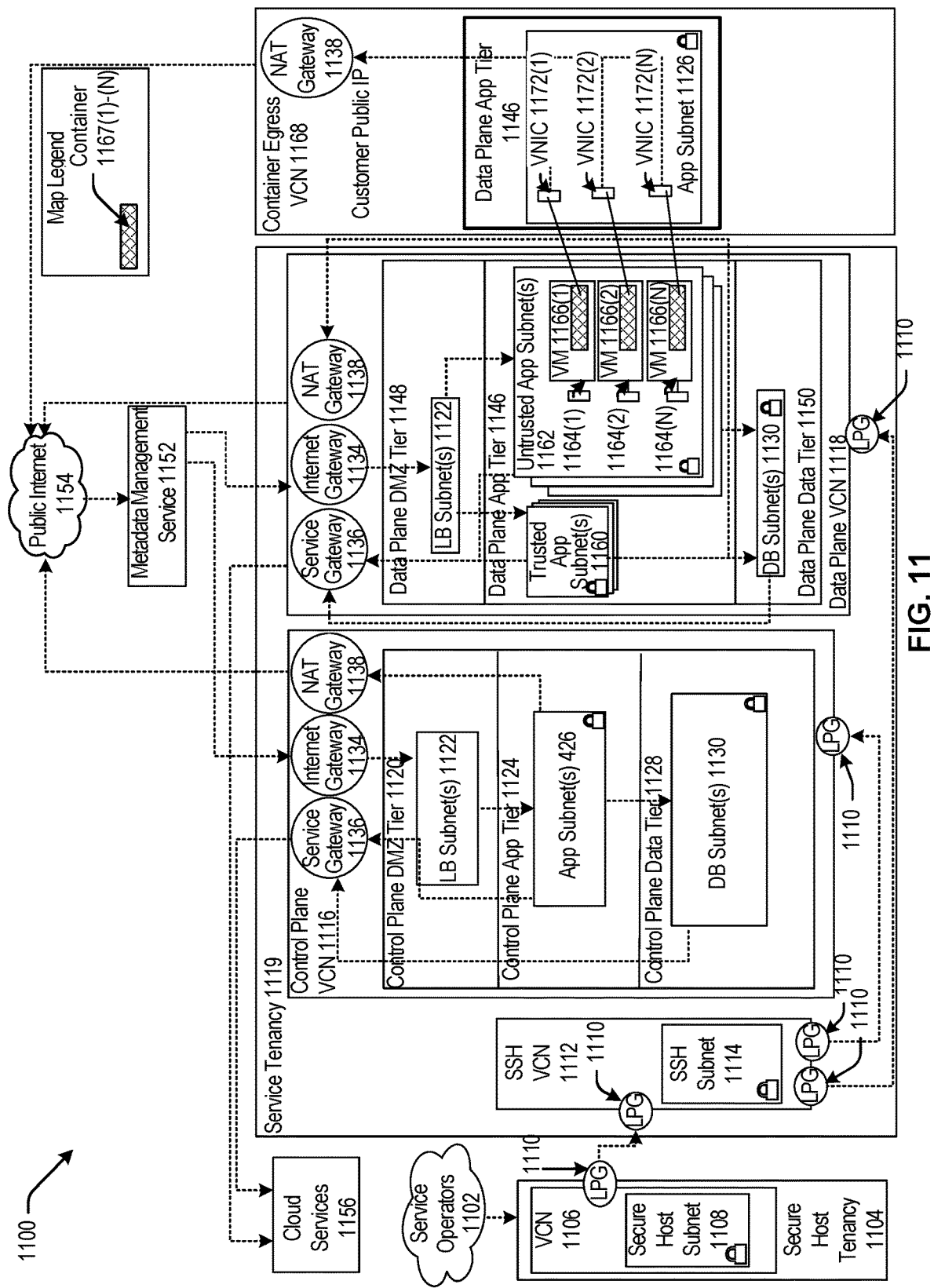
FIG. 11 is a block diagram illustrating another pattern for implementing a cloud infrastructure as a service system, according to at least one embodiment.

FIG. 11 is a block diagram 1100 illustrating another example pattern of an IaaS architecture, according to at least one embodiment. Service operators 1102 (e.g. service operators 802 of FIG. 8) can be communicatively coupled to a secure host tenancy 1104 (e.g. the secure host tenancy 804 of FIG. 8) that can include a virtual cloud network (VCN) 1106 (e.g. the VCN 806 of FIG. 8) and a secure host subnet 1108 (e.g. the secure host subnet 808 of FIG. 8). The VCN 1106 can include an LPG 1110 (e.g. the LPG 810 of FIG. 8) that can be communicatively coupled to an SSH VCN 1112 (e.g. the SSH VCN 812 of FIG. 8) via an LPG 1110 contained in the SSH VCN 1112. The SSH VCN 1112 can include an SSH subnet 1114 (e.g. the SSH subnet 814 of FIG. 8), and the SSH VCN 1112 can be communicatively coupled to a control plane VCN 1116 (e.g. the control plane VCN 816 of FIG. 8) via an LPG 1110 contained in the control plane VCN 1116 and to a data plane VCN 1118 (e.g. the data plane 818 of FIG. 8) via an LPG 1110 contained in the data plane VCN 1118. The control plane VCN 1116 and the data plane VCN 1118 can be contained in a service tenancy 1119 (e.g. the service tenancy 819 of FIG. 8).

The control plane VCN 1116 can include a control plane DMZ tier 1120 (e.g. the control plane DMZ tier 820 of FIG. 8) that can include LB subnet(s) 1122 (e.g. LB subnet(s) 822 of FIG. 8), a control plane app tier 1124 (e.g. the control plane app tier 824 of FIG. 8) that can include app subnet(s) 1126 (e.g. app subnet(s) 826 of FIG. 8), a control plane data tier 1128 (e.g. the control plane data tier 828 of FIG. 8) that can include DB subnet(s) 1130 (e.g. DB subnet(s) 1030 of FIG. 10). The LB subnet(s) 1122 contained in the control plane DMZ tier 1120 can be communicatively coupled to the app subnet(s) 1126 contained in the control plane app tier 1124 and to an Internet gateway 1134 (e.g. the Internet gateway 834 of FIG. 8) that can be contained in the control plane VCN 1116, and the app subnet(s) 1126 can be communicatively coupled to the DB subnet(s) 1130 contained in the control plane data tier 1128 and to a service gateway 1136 (e.g. the service gateway of FIG. 8) and a network address translation (NAT) gateway 1138 (e.g. the NAT gateway 838 of FIG. 8). The control plane VCN 1116 can include the service gateway 1136 and the NAT gateway 1138.

The data plane VCN 1118 can include a data plane app tier 1146 (e.g. the data plane app tier 846 of FIG. 8), a data plane DMZ tier 1148 (e.g. the data plane DMZ tier 848 of FIG. 8), and a data plane data tier 1150 (e.g. the data plane data tier 850 of FIG. 8). The data plane DMZ tier 1148 can include LB subnet(s) 1122 that can be communicatively coupled to trusted app subnet(s) 1160 (e.g. trusted app subnet(s) 1060 of FIG. 10) and untrusted app subnet(s) 1162 (e.g. untrusted app subnet(s) 1062 of FIG. 10) of the data plane app tier 1146 and the Internet gateway 1134 contained in the data plane VCN 1118. The trusted app subnet(s) 1160 can be communicatively coupled to the service gateway 1136 contained in the data plane VCN 1118, the NAT gateway 1138 contained in the data plane VCN 1118, and DB subnet(s) 1130 contained in the data plane data tier 1150. The untrusted app subnet(s) 1162 can be communicatively coupled to the service gateway 1136 contained in the data plane VCN 1118 and DB subnet(s) 1130 contained in the data plane data tier 1150. The data plane data tier 1150 can include DB subnet(s) 1130 that can be communicatively coupled to the service gateway 1136 contained in the data plane VCN 1118.

The untrusted app subnet(s) 1162 can include primary VNICs 1164(1)-(N) that can be communicatively coupled to tenant virtual machines (VMs) 1166(1)-(N) residing within the untrusted app subnet(s) 1162. Each tenant VM 1166(1)-(N) can run code in a respective container 1167(1)-(N), and be communicatively coupled to an app subnet 1126 that can be contained in a data plane app tier 1146 that can be contained in a container egress VCN 1168. Respective secondary VNICs 1172(1)-(N) can facilitate communication between the untrusted app subnet(s) 1162 contained in the data plane VCN 1118 and the app subnet contained in the container egress VCN 1168. The container egress VCN can include a NAT gateway 1138 that can be communicatively coupled to public Internet 1154 (e.g. public Internet 854 of FIG. 8).

The Internet gateway 1134 contained in the control plane VCN 1116 and contained in the data plane VCN 1118 can be communicatively coupled to a metadata management service 1152 (e.g. the metadata management system 852 of FIG. 8) that can be communicatively coupled to public Internet 1154. Public Internet 1154 can be communicatively coupled to the NAT gateway 1138 contained in the control plane VCN 1116 and contained in the data plane VCN 1118. The service gateway 1136 contained in the control plane VCN 1116 and contained in the data plane VCN 1118 can be communicatively couple to cloud services 1156.

In some examples, the pattern illustrated by the architecture of block diagram 1100 of FIG. 11 may be considered an exception to the pattern illustrated by the architecture of block diagram 1000 of FIG. 10 and may be desirable for a customer of the IaaS provider if the IaaS provider cannot directly communicate with the customer (e.g., a disconnected region). The respective containers 1167(1)-(N) that are contained in the VMs 1166(1)-(N) for each customer can be accessed in real-time by the customer. The containers 1167(1)-(N) may be configured to make calls to respective secondary VNICs 1172(1)-(N) contained in app subnet(s) 1126 of the data plane app tier 1146 that can be contained in the container egress VCN 1168. The secondary VNICs 1172(1)-(N) can transmit the calls to the NAT gateway 1138 that may transmit the calls to public Internet 1154. In this example, the containers 1167(1)-(N) that can be accessed in real-time by the customer can be isolated from the control plane VCN 1116 and can be isolated from other entities contained in the data plane VCN 1118. The containers 1167(1)-(N) may also be isolated from resources from other customers.

In other examples, the customer can use the containers 1167(1)-(N) to call cloud services 1156. In this example, the customer may run code in the containers 1167(1)-(N) that requests a service from cloud services 1156. The containers 1167(1)-(N) can transmit this request to the secondary VNICs 1172(1)-(N) that can transmit the request to the NAT gateway that can transmit the request to public Internet 1154. Public Internet 1154 can transmit the request to LB subnet(s) 1122 contained in the control plane VCN 1116 via the Internet gateway 1134. In response to determining the request is valid, the LB subnet(s) can transmit the request to app subnet(s) 1126 that can transmit the request to cloud services 1156 via the service gateway 1136.

It should be appreciated that IaaS architectures 800, 900, 1000, 1100 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

Figure 12:
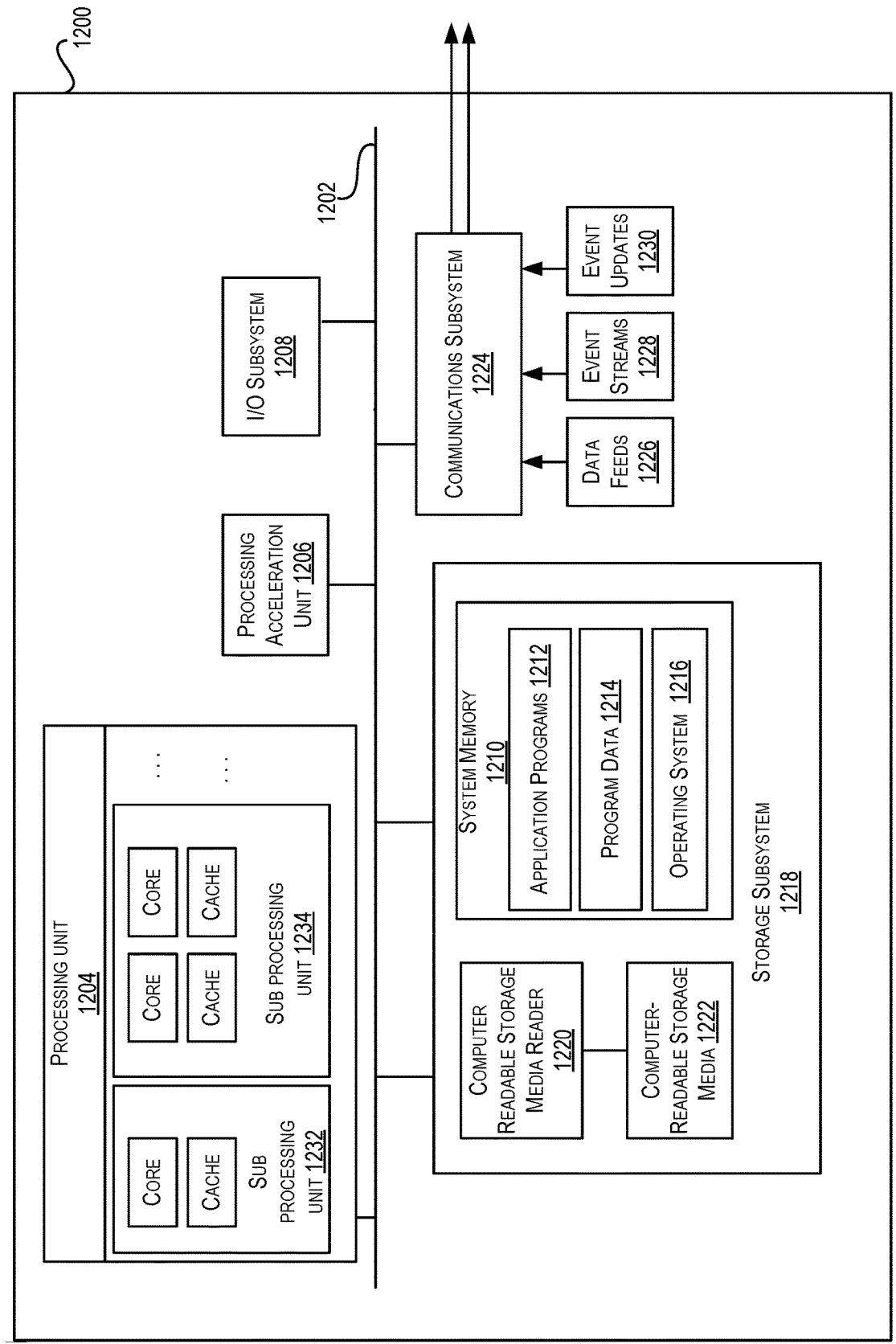
FIG. 12 is a block diagram illustrating an example computer system, according to at least one embodiment.

FIG. 12 illustrates an example computer system 1200, in which various embodiments may be implemented. The system 1200 may be used to implement any of the computer systems described above. As shown in the figure, computer system 1200 includes a processing unit 1204 that communicates with a number of peripheral subsystems via a bus subsystem 1202. These peripheral subsystems may include a processing acceleration unit 1206, an I/O subsystem 1208, a storage subsystem 1218 and a communications subsystem 1224. Storage subsystem 1218 includes tangible computer-readable storage media 1222 and a system memory 1210.

Bus subsystem 1202 provides a mechanism for letting the various components and subsystems of computer system 1200 communicate with each other as intended. Although bus subsystem 1202 is shown schematically as a single bus, alternative embodiments of the bus subsystem may utilize multiple buses. Bus subsystem 1202 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1204, which can be implemented as one or more integrated circuits (e.g., a conventional microprocessor or microcontroller), controls the operation of computer system 1200. One or more processors may be included in processing unit 1204. These processors may include single core or multicore processors. In certain embodiments, processing unit 1204 may be implemented as one or more independent processing units 1232 and/or 1234 with single or multicore processors included in each processing unit. In other embodiments, processing unit 1204 may also be implemented as a quad-core processing unit formed by integrating two dual-core processors into a single chip.

In various embodiments, processing unit 1204 can execute a variety of programs in response to program code and can maintain multiple concurrently executing programs or processes. At any given time, some or all of the program code to be executed can be resident in processor(s) 1204 and/or in storage subsystem 1218. Through suitable programming, processor(s) 1204 can provide various functionalities described above. Computer system 1200 may additionally include a processing acceleration unit 1206, which can include a digital signal processor (DSP), a special-purpose processor, and/or the like.

I/O subsystem 1208 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1200 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1200 may comprise a storage subsystem 1218 that comprises software elements, shown as being currently located within a system memory 1210. System memory 1210 may store program instructions that are loadable and executable on processing unit 1204, as well as data generated during the execution of these programs.

Depending on the configuration and type of computer system 1200, system memory 1210 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1204. In some implementations, system memory 1210 may include multiple different types of memory, such as static random access memory (SRAM) or dynamic random access memory (DRAM). In some implementations, a basic input/output system (BIOS), containing the basic routines that help to transfer information between elements within computer system 1200, such as during start-up, may typically be stored in the ROM. By way of example, and not limitation, system memory 1210 also illustrates application programs 1212, which may include client applications, Web browsers, mid-tier applications, relational database management systems (RDBMS), etc., program data 1214, and an operating system 1216. By way of example, operating system 1216 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 12 OS, and Palm® OS operating systems.

Storage subsystem 1218 may also provide a tangible computer-readable storage medium for storing the basic programming and data constructs that provide the functionality of some embodiments. Software (programs, code modules, instructions) that when executed by a processor provide the functionality described above may be stored in storage subsystem 1218. These software modules or instructions may be executed by processing unit 1204. Storage subsystem 1218 may also provide a repository for storing data used in accordance with the present disclosure.

Storage subsystem 1200 may also include a computer-readable storage media reader 1220 that can further be connected to computer-readable storage media 1222. Together and, optionally, in combination with system memory 1210, computer-readable storage media 1222 may comprehensively represent remote, local, fixed, and/or removable storage devices plus storage media for temporarily and/or more permanently containing, storing, transmitting, and retrieving computer-readable information.

Computer-readable storage media 1222 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 1200.

By way of example, computer-readable storage media 1222 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1222 may include, but is not limited to, Zip® drives, flash memory cards, universal serial bus (USB) flash drives, secure digital (SD) cards, DVD disks, digital video tape, and the like. Computer-readable storage media 1222 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1200.

Communications subsystem 1224 provides an interface to other computer systems and networks. Communications subsystem 1224 serves as an interface for receiving data from and transmitting data to other systems from computer system 1200. For example, communications subsystem 1224 may enable computer system 1200 to connect to one or more devices via the Internet. In some embodiments communications subsystem 1224 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1224 can provide wired network connectivity (e.g., Ethernet) in addition to or instead of a wireless interface.

In some embodiments, communications subsystem 1224 may also receive input communication in the form of structured and/or unstructured data feeds 1226, event streams 1228, event updates 1230, and the like on behalf of one or more users who may use computer system 1200.

By way of example, communications subsystem 1224 may be configured to receive data feeds 1226 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1224 may also be configured to receive data in the form of continuous data streams, which may include event streams 1228 of real-time events and/or event updates 1230, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1224 may also be configured to output the structured and/or unstructured data feeds 1226, event streams 1228, event updates 1230, and the like to one or more databases that may be in communication with one or more streaming data source computers coupled to computer system 1200.

Computer system 1200 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1200 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments have been described, various modifications, alterations, alternative constructions, and equivalents are also encompassed within the scope of the disclosure. Embodiments are not restricted to operation within certain specific data processing environments, but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A computer-implemented method, comprising:
receiving, by a computing device, a query comprising a logical entity qualifier and a data set identifier corresponding to a data set comprising a plurality of electronic files, the logical entity qualifier indicating existence of a pattern within the query;
identifying, by the computing device, search results for the query, the search results comprising a set of data assets from the data set based at least in part on executing the query against the data set;
identifying, by the computing device, a first match between a first plurality of data assets and the pattern indicated by the logical entity qualifier;
identifying, by the computing device, a second match between a second plurality of data assets and the pattern indicated by the logical entity qualifier, the second match being a match of the pattern that differs from the first match;

based at least in part on identifying that the query comprises the logical entity qualifier, generating, by the computing device, a first logical entity comprising a first label representing the first plurality of data assets and the first match and 2) a second logical entity comprising a second label representing the second plurality of data assets; and in response to the query, presenting, by the computing device, a condensed view of the search results, the condensed view excluding the set of data assets that were identified as the search results for the query and comprising the first label representing the first plurality of data assets and the first match and the second label representing the second plurality of data assets and the second match.

2. The computer-implemented method of claim 1, further comprising:
maintaining a mapping indicating a first association between the first logical entity and the first plurality of data assets and a second association between the second logical entity and the second plurality of data assets; and
dynamically updating the mapping over time based at least in part on changes detected in the data set.

3. The computer-implemented method of claim 2, further comprising:
receiving, by the computing device, a subsequent query comprising a particular label corresponding to a particular logical entity of the one or more logical entities;
identifying, by the computing device from the mapping and the particular label, an additional one or more data assets corresponding to the particular logical entity; and
executing, by the computing device, the subsequent query using the additional one or more data assets identified from the mapping and the particular label.

4. The computer-implemented method of claim 2, wherein dynamically updating the mapping further comprises:
identifying an updated set of data assets from the data set based at least in part on subsequently executing the query against the data set; and
generating, from the mapping, an updated mapping based at least in part on identifying new subsets of the set of data assets using the pattern indicated by the logical entity qualifier, the new subsets of the set of data assets each being represented in the mapping with a corresponding label that individually represents a unique match between a new subset of the set of data assets and the pattern, each of the new subsets comprising a collection of data assets that similarly match the pattern.

5. The computer-implemented method of claim 1, further comprising maintaining a plurality of mappings, each mapping of the plurality of mappings indicating a relationship between a particular logical entity, a particular label, and a corresponding subset of data assets that the particular label represents.

6. The computer-implemented method of claim 1, further comprising:
maintaining, by the computing device, a library defining one or more patterns, each of the one or more patterns being associated with a corresponding pattern identifier and one or more regular expressions;
identifying that the query received further comprises a pattern identifier that indicates a second pattern in the query; and
updating the query to include a corresponding pattern obtained from the library and associated with the pattern identifier, wherein identifying the set of data assets from the data set is further based at least in part on corresponding pattern associated with the pattern identifier.

7. The computer-implemented method of claim 6, further comprising:
detecting, by the computing device, a modification to the corresponding pattern associated with the pattern identifier, the modification being a change in the library defining the one or more patterns;
based at least in part on detecting the modification to the corresponding pattern, identifying an updated set of data assets from the data set based at least in part on subsequently executing the query against the data set; and
updating a mapping associated with one or more logical entities based at least in part on identifying new subsets of the set of data assets using the pattern indicated within the query by the logical entity qualifier, the new subsets of the set of data assets each being represented in the mapping with a corresponding label that individually represents a unique match between a new subset of the set of data assets and the pattern, each of the new subsets comprising a collection of data assets that similarly match the pattern.

8. The computer-implemented method of claim 1, wherein the first logical entity further comprises a first mapping between the first label and the first plurality of data assets, and wherein the second logical entity further comprises a second mapping between the second label and the second plurality of data assets.

9. The computer-implemented method of claim 1, wherein each of the set of data assets of the search results are represented by a respective label of a plurality of labels, and wherein at least one label of the plurality of labels represents two or more data assets of the search results.

10. A computing device, comprising:
one or more hardware processors communicatively coupled to a computer-readable medium; and
a computer-readable medium storing non-transitory computer-executable program instructions that, when executed by the one or more hardware processors, causes the computing device to perform operations comprising:
receiving a query comprising a logical entity qualifier and a data set identifier corresponding to a data set comprising a plurality of electronic files, the logical entity qualifier indicating existence of a pattern within the query;
identifying search results for the query, the search results comprising a set of data assets from the data set based at least in part on executing the query against the data set;
identifying a first match between a first plurality of data assets and the pattern indicated by the logical entity qualifier;
identifying a second match between a second plurality of data assets and the pattern indicated by the logical entity qualifier, the second match being a match of the pattern that differs from the first match;
generating, based at least in part on identifying that the query comprises the logical entity qualifier, a first logical entity comprising a first label representing the first plurality of data assets and the first match and 2) a second logical entity comprising a second label representing the second plurality of data assets; and in response to the query, presenting a condensed view of the search results, the condensed view excluding the set of data assets that were identified as the search results for the query and comprising the first label representing the first plurality of data assets and the first match and the second label representing the second plurality of data assets and the second match.

11. The computing device of claim 10, wherein the operations performed by the computing device further comprise:

maintaining a mapping indicating a first association between the first logical entity and the first plurality of data assets and a second association between the second logical entity and the second plurality of data assets; and dynamically updating the mapping over time based at least in part on changes detected in the data set.

12. The computing device of claim 11, wherein the operations performed by the computing device further comprise:

receiving a subsequent query comprising a particular label corresponding to a particular logical entity of the one or more logical entities;

identifying, from the mapping and the particular label, an additional one or more data assets corresponding to the particular logical entity; and executing the subsequent query using the one or more data assets identified from the mapping and the particular label.

13. The computing device of claim 11, wherein dynamically updating the mapping further comprises:

identifying an updated set of data assets from the data set based at least in part on subsequently executing the query against the data set; and generating, from the mapping, an updated mapping based at least in part on identifying new subsets of the set of data assets using the pattern indicated by the logical entity qualifier, the new subsets of the set of data assets each being represented in the mapping with a corresponding label that individually represents a unique match between a new subset of the set of data assets and the pattern, each of the new subsets comprising a collection of data assets that similarly match the pattern.

14. The computing device of claim 10, wherein the operations performed by the computing device further comprise maintaining a plurality of mappings, each mapping of the plurality of mappings indicating a relationship between a particular logical entity, a particular label, and a corresponding subset of data assets that the particular label represents.

15. The computing device of claim 10, wherein the operations performed by the computing device further comprise:

maintaining a library defining one or more patterns, each of the one or more patterns being associated with a corresponding pattern identifier and one or more regular expressions;

identifying that the query received further comprises a pattern identifier that indicates a second pattern in the query; and updating the query to include a corresponding pattern obtained from the library and associated with the pattern identifier, wherein identifying the set of data assets from the data set is further based at least in part on corresponding pattern associated with the pattern identifier.

16. The computing device of claim 15, wherein the operations performed by the computing device further comprise:

detecting a modification to the corresponding pattern associated with the pattern identifier, the modification being a change in the library defining the one or more patterns;

based at least in part on detecting the modification to the corresponding pattern, identifying an updated set of data assets from the data set based at least in part on subsequently executing the query against the data set; and updating a mapping associated with one or more logical entities based at least in part on identifying new subsets of the set of data assets using the pattern indicated within the query by the logical entity qualifier, the new subsets of the set of data assets each being represented in the mapping with a corresponding label that individually represents a unique match between a new subset of the set of data assets and the pattern, each of the new subsets comprising a collection of data assets that similarly match the pattern.

17. A non-transitory computer-readable medium storing computer-executable program instructions that, when executed by a hardware processor of a computing device, cause the computing device to perform operations comprising:

receiving a query comprising a logical entity qualifier and a data set identifier corresponding to a data set comprising a plurality of electronic files, the logical entity qualifier indicating existence of a pattern within the query;

identifying search results for the query, the search results comprising a set of data assets from the data set based at least in part on executing the query against the data set;

identifying a first match between a first plurality of data assets and the pattern indicated by the logical entity qualifier;

identifying a second match between a second plurality of data assets and the pattern indicated by the logical entity qualifier, the second match being a match of the pattern that differs from the first match;

generating, based at least in part on identifying that the query comprises the logical entity qualifier, a first logical entity comprising a first label representing the first plurality of data assets and the first match and 2) a second logical entity comprising a second label representing the second plurality of data assets; and in response to the query, presenting a condensed view of the search results, the condensed view excluding the set of data assets that were identified as the search results for the query and comprising the first label representing the first plurality of data assets and the first match and the second label representing the second plurality of data assets and the second match.

18. The non-transitory computer-readable medium of claim 17, wherein the operations performed by the computing device further comprise:

maintaining a mapping indicating a first association between the first logical entity and the first plurality of data assets and a second association between the second logical entity and the second plurality of data assets; and dynamically updating the mapping over time based at least in part on changes detected in the data set.

19. The non-transitory computer-readable medium of claim 18, wherein the operations performed by the computing device further comprise:

receiving a subsequent query comprising a particular label corresponding to a particular logical entity of the one or more logical entities;

identifying, from the mapping and the particular label, an additional one or more data assets corresponding to the particular logical entity; and executing the subsequent query using the one or more data assets identified from the mapping and the particular label.

20. The non-transitory computer-readable medium of claim 18, wherein dynamically updating the mapping further comprises:

identifying an updated set of data assets from the data set based at least in part on subsequently executing the query against the data set; and generating, from the mapping, an updated mapping based at least in part on identifying new subsets of the set of data assets using the pattern indicated by the logical entity qualifier, the new subsets of the set of data assets each being represented in the mapping with a corresponding label that individually represents a unique match between a new subset of the set of data assets and the pattern, each of the new subsets comprising a collection of data assets that similarly match the pattern.

* * * * *